United States Patent
Vyakaranam et al.

(10) Patent No.: US 12,031,097 B2
(45) Date of Patent: Jul. 9, 2024

(54) ANTIFOULING AGENTS FOR PLASTIC-DERIVED SYNTHETIC FEEDSTOCKS

(71) Applicant: ECOLAB USA Inc., St. Paul, MN (US)

(72) Inventors: Kameswara Vyakaranam, Sugar Land, TX (US); Karina Eureste, Houston, TX (US); Theodore C. Arnst, Sugar Land, TX (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 17/964,275

(22) Filed: Oct. 12, 2022

(65) Prior Publication Data

US 2023/0120367 A1    Apr. 20, 2023

Related U.S. Application Data

(60) Provisional application No. 63/255,784, filed on Oct. 14, 2021.

(51) Int. Cl.
*C10G 75/04* (2006.01)

(52) U.S. Cl.
CPC ..... *C10G 75/04* (2013.01); *C10G 2300/1003* (2013.01); *C10G 2300/201* (2013.01); *C10G 2300/80* (2013.01)

(58) Field of Classification Search
CPC .. C10B 53/07; C10G 1/10; C10G 2300/1003; C10G 2300/201; C10G 2300/80; C10G 75/04; Y02P 20/143
See application file for complete search history.

(56) References Cited

U.S. PATENT DOCUMENTS

| | | | |
|---|---|---|---|
| 3,093,623 | A | 6/1963 | Ilnycky |
| 3,819,589 | A | 6/1974 | Fauke et al. |

(Continued)

FOREIGN PATENT DOCUMENTS

| | | |
|---|---|---|
| AU | 2005227358 A1 | 7/2006 |
| AU | 2013263852 A1 | 8/2014 |

(Continued)

OTHER PUBLICATIONS

English Translation WO-2017009208-A1 (Year: 2017).*

(Continued)

*Primary Examiner* — Ellen M McAvoy
*Assistant Examiner* — Chantel Graham
(74) *Attorney, Agent, or Firm* — Eric D. Babych; Barnes & Thornburg LLP

(57) ABSTRACT

Disclosed are antifouling agents used in compositions and methods to reduce or prevent foulants in synthetic feedstocks derived from plastic. A method of reducing or preventing fouling in a plastic-derived synthetic feedstock composition may include adding an antifouling agent including a carboxylic acid anhydride or a copolymer of a dicarboxylic acid anhydride and alpha olefin to a synthetic feedstock composition derived from plastic pyrolysis containing a foulant to provide treated pyrolysate. The foulant may include, for example, nylon, polyvinyl chlorides, polyethylene terephthalate, polyamides, caprolactam, benzoic acid, phenol, p-cresol, dimethylphenol, isopropyl phenol, tert-butylphenol, dimethylethylphenol, napthalenol, varying lengths of alkenes and alkanes, propylene, tolune, pentene, butane, tetramethylindole, ethylbenzene, ethyldimethylpyrrole, dimethylfuran, tetrahydroquinoline, and any combination thereof.

20 Claims, 8 Drawing Sheets

(56) References Cited

U.S. PATENT DOCUMENTS

| | | |
|---|---|---|
| 3,901,951 A | 8/1975 | Nishizaki |
| 3,947,368 A | 3/1976 | Sweeney |
| 4,030,984 A | 6/1977 | Chambers |
| 4,108,730 A | 8/1978 | Chen et al. |
| 4,118,281 A | 10/1978 | Yan |
| 4,121,026 A | 10/1978 | Cheng et al. |
| 4,175,211 A | 11/1979 | Chen et al. |
| 4,210,491 A | 7/1980 | Schulman |
| 4,211,534 A | 7/1980 | Feldman |
| 4,235,675 A | 11/1980 | Bechthold |
| 4,235,676 A | 11/1980 | Chambers |
| 4,252,542 A | 2/1981 | Spence |
| 4,731,095 A * | 3/1988 | Garapon ............... C08F 8/32 44/346 |
| 4,732,092 A | 3/1988 | Gould |
| 4,874,395 A | 10/1989 | Meyer |
| 4,900,331 A | 2/1990 | Le |
| 4,900,332 A | 2/1990 | Denis et al. |
| 4,941,952 A | 7/1990 | Betz |
| 4,948,495 A | 8/1990 | Coburn |
| 4,970,969 A | 11/1990 | Koptis et al. |
| 4,983,278 A | 1/1991 | Cha et al. |
| 5,167,772 A | 12/1992 | Parker, Sr. |
| 5,182,036 A | 1/1993 | Okorodudu et al. |
| 5,214,224 A | 5/1993 | Comer et al. |
| 5,316,734 A | 5/1994 | Yamaguchi |
| 5,425,789 A | 6/1995 | Lewtas et al. |
| 5,441,545 A | 8/1995 | Lewtas et al. |
| 5,464,876 A | 11/1995 | Lyding et al. |
| 5,468,780 A | 11/1995 | Kubota et al. |
| 5,509,944 A * | 4/1996 | Venkatadri ............ C10L 10/04 44/430 |
| 5,707,943 A | 1/1998 | Covitch |
| 5,711,767 A * | 1/1998 | Gande ................... C10L 10/04 44/426 |
| 5,720,232 A | 2/1998 | Meador |
| 5,851,429 A | 12/1998 | Magyar |
| 5,894,012 A | 4/1999 | Denison |
| 6,036,124 A | 3/2000 | Takahashi et al. |
| 6,143,043 A | 11/2000 | Botros |
| 6,149,881 A | 11/2000 | Hanson et al. |
| 6,150,577 A | 11/2000 | Miller et al. |
| 6,187,083 B1 | 2/2001 | Malhotra et al. |
| 6,774,271 B2 | 8/2004 | Jiang |
| 6,774,272 B2 | 8/2004 | Miller |
| 6,822,126 B2 | 11/2004 | Miller |
| 6,830,597 B1 | 12/2004 | Green |
| 7,041,738 B2 | 5/2006 | Krull et al. |
| 7,413,583 B2 | 8/2008 | Langer et al. |
| 7,534,748 B2 | 5/2009 | Patel et al. |
| 7,820,604 B2 | 10/2010 | Ruhe, Jr. et al. |
| 7,820,605 B2 | 10/2010 | Stokes et al. |
| 8,048,333 B2 | 11/2011 | Vitale et al. |
| 8,088,961 B2 | 1/2012 | Miller |
| 8,158,842 B2 | 4/2012 | McCall |
| 8,304,592 B2 | 11/2012 | Luebke |
| 8,329,969 B2 | 12/2012 | McCall et al. |
| 8,394,264 B2 | 3/2013 | Sappok et al. |
| 8,425,627 B2 | 4/2013 | Dietz et al. |
| 8,466,332 B1 | 6/2013 | Hemmings et al. |
| 8,703,674 B2 | 4/2014 | Umehara et al. |
| 8,722,596 B2 | 5/2014 | Umehara et al. |
| 8,927,797 B2 | 1/2015 | Sarker |
| 8,992,636 B1 | 3/2015 | Fang et al. |
| 9,012,385 B2 | 4/2015 | Di Biase et al. |
| 9,175,141 B2 | 11/2015 | Wray et al. |
| 9,181,510 B2 | 11/2015 | Barton et al. |
| 9,200,207 B2 | 12/2015 | Huang et al. |
| 9,234,138 B1 | 1/2016 | Li et al. |
| 9,315,732 B1 | 4/2016 | Fowler |
| 9,534,183 B2 | 1/2017 | Papin et al. |
| 9,556,395 B2 | 1/2017 | Kashani-Shirazi et al. |
| 9,624,439 B2 | 4/2017 | Bakaya et al. |
| 10,131,847 B2 | 11/2018 | McNamara et al. |
| 10,150,928 B2 | 12/2018 | Scherer et al. |
| 10,160,927 B2 | 12/2018 | Hellawell et al. |
| 10,208,253 B2 | 2/2019 | McNamara et al. |
| 10,233,395 B2 | 3/2019 | Ward et al. |
| 2002/0040546 A1 * | 4/2002 | Botros ................. C10L 1/2364 44/393 |
| 2003/0031722 A1 | 2/2003 | Cao et al. |
| 2003/0047437 A1 | 3/2003 | Stankevitch |
| 2003/0050519 A1 | 3/2003 | Cheng |
| 2003/0104943 A1 | 6/2003 | Lennon et al. |
| 2003/0166811 A1 * | 9/2003 | Peiffer ................. C10L 1/143 526/272 |
| 2004/0152930 A1 | 8/2004 | Dennis |
| 2004/0192980 A1 | 9/2004 | Appel et al. |
| 2004/0204620 A1 | 10/2004 | Grispin |
| 2005/0050792 A1 | 3/2005 | Corkwell et al. |
| 2005/0086855 A1 | 4/2005 | Tack et al. |
| 2005/0131260 A1 | 6/2005 | Tokarz |
| 2006/0037852 A1 | 2/2006 | Noto |
| 2007/0051033 A1 | 3/2007 | Martin et al. |
| 2007/0161519 A1 * | 7/2007 | Cravey ................. C10L 1/232 508/463 |
| 2007/0173419 A1 | 7/2007 | Mead et al. |
| 2008/0051520 A1 | 2/2008 | Srinivasan et al. |
| 2008/0103076 A1 | 5/2008 | Ruhe et al. |
| 2008/0178522 A1 | 7/2008 | Siggelkow et al. |
| 2008/0200738 A1 | 8/2008 | Grispin |
| 2008/0295397 A1 | 12/2008 | Muth |
| 2009/0170739 A1 | 7/2009 | Miller |
| 2010/0065411 A1 | 3/2010 | Li et al. |
| 2010/0180492 A1 | 7/2010 | Krull et al. |
| 2010/0320070 A1 | 12/2010 | DeWhitt |
| 2011/0042268 A1 * | 2/2011 | Stark .................... C10G 75/04 208/47 |
| 2011/0083953 A1 | 4/2011 | Horn et al. |
| 2011/0306808 A1 | 12/2011 | Appel et al. |
| 2012/0215043 A1 | 8/2012 | Gaffney |
| 2012/0220675 A1 | 8/2012 | DeWhitt |
| 2012/0245063 A1 | 9/2012 | DiBiase et al. |
| 2012/0255222 A1 | 10/2012 | DiBiase et al. |
| 2012/0261247 A1 | 10/2012 | McNamara et al. |
| 2012/0264662 A1 | 10/2012 | DiBiase et al. |
| 2012/0264664 A1 | 10/2012 | DiBiase et al. |
| 2012/0277133 A1 | 11/2012 | DiBiase et al. |
| 2012/0283156 A1 | 11/2012 | DiBiase et al. |
| 2013/0015608 A1 | 1/2013 | Hamby et al. |
| 2013/0025189 A1 | 1/2013 | Burgazli et al. |
| 2013/0225462 A1 | 8/2013 | Di Biase et al. |
| 2013/0227878 A1 | 9/2013 | Wolf et al. |
| 2014/0054815 A1 | 2/2014 | Houk et al. |
| 2014/0190692 A1 | 7/2014 | Hibbeler et al. |
| 2014/0259923 A1 | 9/2014 | Blair |
| 2014/0262728 A1 | 9/2014 | Karanikas |
| 2014/0338253 A1 | 11/2014 | Jung et al. |
| 2015/0060258 A1 | 3/2015 | Appel et al. |
| 2015/0113859 A1 | 4/2015 | Voelkel et al. |
| 2015/0113867 A1 | 4/2015 | Voelkel et al. |
| 2015/0139889 A1 | 5/2015 | Horn et al. |
| 2015/0197692 A1 | 7/2015 | Wang |
| 2015/0203784 A1 | 7/2015 | Barton et al. |
| 2015/0232781 A1 | 8/2015 | Barton |
| 2015/0284495 A1 | 10/2015 | Reed et al. |
| 2016/0040073 A1 | 2/2016 | Bakaya et al. |
| 2016/0040089 A1 | 2/2016 | Baker et al. |
| 2016/0046880 A1 | 2/2016 | Combs |
| 2016/0115369 A1 | 4/2016 | Soriano, Jr. et al. |
| 2016/0169509 A1 | 6/2016 | Fowler |
| 2016/0257879 A1 | 9/2016 | Huang et al. |
| 2017/0015911 A1 | 1/2017 | Houk et al. |
| 2017/0081591 A1 | 3/2017 | Reed |
| 2017/0114279 A1 | 4/2017 | Alyaser |
| 2017/0130153 A1 | 5/2017 | Peretolchin et al. |
| 2017/0190949 A1 | 7/2017 | Solomon et al. |
| 2017/0218278 A1 | 8/2017 | Bakaya et al. |
| 2017/0321124 A1 | 11/2017 | Hsu et al. |
| 2017/0349836 A1 | 12/2017 | Duncan |
| 2018/0010048 A1 | 1/2018 | Oluwaseun et al. |
| 2018/0010049 A1 | 1/2018 | Tenore et al. |
| 2018/0010050 A1 | 1/2018 | Van Der Ree et al. |
| 2018/0066200 A1 | 3/2018 | Scherer |

(56) References Cited

U.S. PATENT DOCUMENTS

| | | | |
|---|---|---|---|
| 2018/0086862 A1 | 3/2018 | Kundu et al. | |
| 2018/0244605 A1* | 8/2018 | Khanlari | C07D 211/76 |
| 2018/0251692 A1 | 9/2018 | Mezger et al. | |
| 2019/0168192 A1 | 6/2019 | Gaffney | |
| 2019/0177652 A1* | 6/2019 | Atkins | C10M 177/00 |
| 2019/0203135 A1 | 7/2019 | Soriano, Jr. et al. | |
| 2020/0017786 A1 | 1/2020 | Li et al. | |
| 2022/0081634 A1 | 3/2022 | Arnst et al. | |
| 2022/0396735 A1* | 12/2022 | Wu | C10G 1/02 |

FOREIGN PATENT DOCUMENTS

| | | |
|---|---|---|
| BR | PI1004634 A2 | 3/2013 |
| BR | 102016027627 A2 | 6/2018 |
| CA | 2202941 A1 | 10/1998 |
| CN | 1338341 A | 3/2002 |
| CN | 1149598 C | 5/2004 |
| CN | 1239108 C | 2/2006 |
| CN | 101328414 A | 12/2008 |
| CN | 101386724 A | 3/2009 |
| CN | 101172238 B | 4/2010 |
| CN | 201458375 U | 5/2010 |
| CN | 101831313 A | 9/2010 |
| CN | 201581050 U | 9/2010 |
| CN | 201648314 U | 11/2010 |
| CN | 1962735 B | 12/2010 |
| CN | 101177502 B | 12/2010 |
| CN | 102504855 A | 6/2012 |
| CN | 202265543 U | 6/2012 |
| CN | 202415456 U | 9/2012 |
| CN | 101886020 B | 1/2013 |
| CN | 202705307 U | 1/2013 |
| CN | 202725185 U | 2/2013 |
| CN | 101210173 B | 4/2013 |
| CN | 101235279 B | 4/2013 |
| CN | 202953992 U | 5/2013 |
| CN | 202953993 U | 5/2013 |
| CN | 203043985 U | 7/2013 |
| CN | 203048877 U | 7/2013 |
| CN | 103242872 A | 8/2013 |
| CN | 103305253 A | 9/2013 |
| CN | 103382398 A | 11/2013 |
| CN | 203269856 U | 11/2013 |
| CN | 103450912 A | 12/2013 |
| CN | 203319926 U | 12/2013 |
| CN | 203333590 U | 12/2013 |
| CN | 203487095 U | 3/2014 |
| CN | 102942943 B | 4/2014 |
| CN | 104031665 A | 9/2014 |
| CN | 104073273 A | 10/2014 |
| CN | 104073279 A | 10/2014 |
| CN | 104130787 A | 11/2014 |
| CN | 104140827 A | 11/2014 |
| CN | 203960130 U | 11/2014 |
| CN | 204058363 U | 12/2014 |
| CN | 204211689 U | 3/2015 |
| CN | 204224524 U | 3/2015 |
| CN | 103571565 B | 4/2015 |
| CN | 204281679 U | 4/2015 |
| CN | 103172934 B | 6/2015 |
| CN | 204417413 U | 6/2015 |
| CN | 204434552 U | 7/2015 |
| CN | 103275746 B | 8/2015 |
| CN | 204644272 U | 9/2015 |
| CN | 104974779 A | 10/2015 |
| CN | 103980925 B | 12/2015 |
| CN | 204939396 U | 1/2016 |
| CN | 104531199 B | 3/2016 |
| CN | 205088187 U | 3/2016 |
| CN | 105462660 A | 4/2016 |
| CN | 205223110 U | 5/2016 |
| CN | 205347348 U | 6/2016 |
| CN | 105778955 A | 7/2016 |
| CN | 104560100 B | 8/2016 |
| CN | 205473591 U | 8/2016 |
| CN | 105925292 A | 9/2016 |
| CN | 205635485 U | 10/2016 |
| CN | 205653411 U | 10/2016 |
| CN | 106085473 A | 11/2016 |
| CN | 106185941 A | 12/2016 |
| CN | 106185943 A | 12/2016 |
| CN | 205774331 U | 12/2016 |
| CN | 106281384 A | 1/2017 |
| CN | 106433724 A | 2/2017 |
| CN | 106433726 A | 2/2017 |
| CN | 106433732 A | 2/2017 |
| CN | 106544050 A | 3/2017 |
| CN | 106544051 A | 3/2017 |
| CN | 106698421 A | 5/2017 |
| CN | 104650943 B | 6/2017 |
| CN | 206308313 U | 7/2017 |
| CN | 206318947 U | 7/2017 |
| CN | 206318948 U | 7/2017 |
| CN | 107033941 A | 8/2017 |
| CN | 107057745 A | 8/2017 |
| CN | 206392023 U | 8/2017 |
| CN | 206408173 U | 8/2017 |
| CN | 105713641 B | 9/2017 |
| CN | 107151559 A | 9/2017 |
| CN | 107163967 A | 9/2017 |
| CN | 107216888 A | 9/2017 |
| CN | 105733644 B | 10/2017 |
| CN | 107236568 A | 10/2017 |
| CN | 107267181 A | 10/2017 |
| CN | 107267182 A | 10/2017 |
| CN | 206545002 U | 10/2017 |
| CN | 107384447 A | 11/2017 |
| CN | 107384465 A | 11/2017 |
| CN | 107418603 A | 12/2017 |
| CN | 107418605 A | 12/2017 |
| CN | 107420912 A | 12/2017 |
| CN | 107433280 A | 12/2017 |
| CN | 107433281 A | 12/2017 |
| CN | 107433282 A | 12/2017 |
| CN | 107434977 A | 12/2017 |
| CN | 107446608 A | 12/2017 |
| CN | 107446610 A | 12/2017 |
| CN | 107523362 A | 12/2017 |
| CN | 206692598 U | 12/2017 |
| CN | 206720749 U | 12/2017 |
| CN | 107537847 A | 1/2018 |
| CN | 107641522 A | 1/2018 |
| CN | 107674695 A | 2/2018 |
| CN | 106118708 B | 3/2018 |
| CN | 107828438 A | 3/2018 |
| CN | 105462615 B | 4/2018 |
| CN | 207362144 U | 5/2018 |
| CN | 108117881 A | 6/2018 |
| CN | 207446192 U | 6/2018 |
| CN | 207537397 U | 6/2018 |
| CN | 105038829 B | 7/2018 |
| CN | 105779017 B | 7/2018 |
| CN | 105950200 B | 7/2018 |
| CN | 106635116 B | 7/2018 |
| CN | 108285800 A | 7/2018 |
| CN | 108299673 A | 7/2018 |
| CN | 105754628 B | 8/2018 |
| CN | 108384565 A | 8/2018 |
| CN | 108395572 A | 8/2018 |
| CN | 108410007 A | 8/2018 |
| CN | 108441241 A | 8/2018 |
| CN | 108467513 A | 8/2018 |
| CN | 106635114 B | 9/2018 |
| CN | 106753502 B | 9/2018 |
| CN | 108517222 A | 9/2018 |
| CN | 207845569 U | 9/2018 |
| CN | 207845574 U | 9/2018 |
| CN | 207952195 U | 10/2018 |
| CN | 106513419 B | 11/2018 |
| CN | 108841405 A | 11/2018 |
| CN | 106338066 B | 12/2018 |
| CN | 106338067 B | 12/2018 |
| CN | 109181738 A | 1/2019 |
| CN | 109266375 A | 1/2019 |

(56) References Cited

FOREIGN PATENT DOCUMENTS

| | | |
|---|---|---|
| CN | 106185938 B | 2/2019 |
| CN | 106734060 B | 4/2019 |
| CN | 106318546 B | 5/2019 |
| CN | 106433725 B | 5/2019 |
| CN | 109749757 A | 5/2019 |
| CN | 109776274 A | 5/2019 |
| CN | 108085044 B | 10/2019 |
| CN | 108441242 B | 4/2020 |
| CN | 112063403 A | 12/2020 |
| CN | 106433703 B | 1/2022 |
| CN | 107057738 B | 8/2023 |
| DE | 131092 A1 | 5/1978 |
| DE | 2748510 A1 | 5/1978 |
| DE | 2725650 C3 | 1/1980 |
| DE | 3205603 A1 | 11/1982 |
| DE | 3030593 C2 | 1/1987 |
| DE | 3323161 C2 | 2/1987 |
| DE | 2917293 C2 | 5/1987 |
| DE | 4103738 A1 | 10/1991 |
| DE | 4210237 C2 | 2/1994 |
| DE | 4234385 A1 | 4/1994 |
| DE | 4403128 A1 | 8/1995 |
| DE | 4417721 A1 | 11/1995 |
| DE | 4423394 C1 | 3/1996 |
| DE | 4435238 A1 | 4/1996 |
| DE | 4437881 A1 | 4/1996 |
| DE | 4329458 C2 | 5/1996 |
| DE | 19505544 C1 | 5/1996 |
| DE | 19617450 A1 | 11/1997 |
| DE | 19800567 A1 | 7/1999 |
| DE | 19834596 C1 | 2/2000 |
| DE | 4446964 C2 | 7/2002 |
| DE | 202006003429 U1 | 7/2007 |
| DE | 202006003430 U1 | 7/2007 |
| DE | 102006014457 A1 | 10/2007 |
| DE | 102008019237 A1 | 11/2008 |
| DE | 102007054343 A1 | 5/2009 |
| DE | 102007051373 B4 | 11/2010 |
| DE | 102012204648 A1 | 9/2013 |
| DE | 102012109874 A1 | 4/2014 |
| DE | 102014014816 A1 | 4/2016 |
| DE | 102012008457 B4 | 11/2016 |
| EP | 0072387 B1 | 1/1987 |
| EP | 0226895 B1 | 8/1989 |
| EP | 0297420 B1 | 2/1991 |
| EP | 0316827 B1 | 5/1991 |
| EP | 0191967 B1 | 3/1992 |
| EP | 0410889 B1 | 10/1993 |
| EP | 0659867 A2 | 6/1995 |
| EP | 0391735 B1 | 8/1995 |
| EP | 0890629 A1 | 1/1999 |
| EP | 0713906 B1 | 5/1999 |
| EP | 0949321 A2 | 10/1999 |
| EP | 0693527 B1 | 6/2001 |
| EP | 1302526 A1 | 4/2003 |
| EP | 1577366 A2 | 9/2005 |
| EP | 1380635 B1 | 1/2013 |
| EP | 1380635 B1 * | 1/2013 ............. C10L 1/143 |
| EP | 1905811 B1 | 8/2014 |
| EP | 2942382 A1 | 11/2015 |
| EP | 1577367 B1 | 3/2016 |
| EP | 2783764 B1 | 7/2016 |
| EP | 3085757 A1 | 10/2016 |
| EP | 1686141 B1 | 12/2018 |
| EP | 3260181 B1 | 9/2019 |
| EP | 3421576 B1 | 3/2020 |
| FR | 2178061 B1 | 5/1976 |
| GB | 1525114 A | 9/1978 |
| GB | 2303859 A | 3/1997 |
| GB | 2434372 A | 7/2007 |
| GB | 2503065 B | 11/2014 |
| GB | 2515560 B | 12/2016 |
| GB | 2539518 B | 9/2017 |
| GB | 2570019 B | 4/2021 |
| JP | S511268 Y2 | 1/1976 |
| JP | S5187584 U | 7/1976 |
| JP | S52144074 U | 11/1977 |
| JP | S5345302 Y2 | 10/1978 |
| JP | S5424981 Y2 | 8/1979 |
| JP | S5798591 U | 6/1982 |
| JP | S5971395 A | 4/1984 |
| JP | S6090293 A | 5/1985 |
| JP | S61123837 A | 6/1986 |
| JP | S62236893 A | 10/1987 |
| JP | S63260981 A | 10/1988 |
| JP | H01115918 A | 5/1989 |
| JP | H0397788 A | 4/1991 |
| JP | H03243692 A | 10/1991 |
| JP | H05100427 A | 4/1993 |
| JP | H05171159 A | 7/1993 |
| JP | H05320658 A | 12/1993 |
| JP | H06134434 A | 5/1994 |
| JP | H06158062 A | 6/1994 |
| JP | H06166880 A | 6/1994 |
| JP | H0948982 A | 2/1997 |
| JP | H0948983 A | 2/1997 |
| JP | H0995676 A | 4/1997 |
| JP | H09169982 A | 6/1997 |
| JP | H09310075 A | 12/1997 |
| JP | H1059704 A | 3/1998 |
| JP | H10110174 A | 4/1998 |
| JP | H10121056 A | 5/1998 |
| JP | H10279950 A | 10/1998 |
| JP | H10298569 A | 11/1998 |
| JP | H10330761 A | 12/1998 |
| JP | H10338886 A | 12/1998 |
| JP | H11166184 A | 6/1999 |
| JP | H11286686 A | 10/1999 |
| JP | H11286687 U | 10/1999 |
| JP | 2000086224 A | 3/2000 |
| JP | 2000191766 A | 7/2000 |
| JP | 2000239233 A | 9/2000 |
| JP | 2000265172 A | 9/2000 |
| JP | 2000290661 A | 10/2000 |
| JP | 2000309781 A | 11/2000 |
| JP | 2000355690 A | 12/2000 |
| JP | 2001049263 A | 2/2001 |
| JP | 2001115163 A | 4/2001 |
| JP | 2001187406 A | 7/2001 |
| JP | 2001200268 A | 7/2001 |
| JP | 2001232634 A | 8/2001 |
| JP | 2001232637 A | 8/2001 |
| JP | 2001240406 A | 9/2001 |
| JP | 2002020535 A | 1/2002 |
| JP | 2002047493 A | 2/2002 |
| JP | 2002053869 A | 2/2002 |
| JP | 2002138286 A | 5/2002 |
| JP | 2002285165 A | 10/2002 |
| JP | 2002327182 A | 11/2002 |
| JP | 2002332380 A | 11/2002 |
| JP | 2003039056 A | 2/2003 |
| JP | 2003041265 A | 2/2003 |
| JP | 3383296 B1 | 3/2003 |
| JP | 2003130319 A | 5/2003 |
| JP | 2003176483 A | 6/2003 |
| JP | 2003205281 A | 7/2003 |
| JP | 2003213034 A | 7/2003 |
| JP | 2003236517 A | 8/2003 |
| JP | 2003268098 A | 9/2003 |
| JP | 2004002054 A | 1/2004 |
| JP | 2004035807 A | 2/2004 |
| JP | 2004099693 A | 4/2004 |
| JP | 2004131358 A | 4/2004 |
| JP | 2004161971 A | 6/2004 |
| JP | 2004285134 A | 10/2004 |
| JP | 2004285255 A | 10/2004 |
| JP | 2004307779 A | 11/2004 |
| JP | 2004307780 A | 11/2004 |
| JP | 2005015701 A | 1/2005 |
| JP | 2005097737 A | 4/2005 |
| JP | 2005153434 A | 6/2005 |
| JP | 2005154510 A | 6/2005 |
| JP | 2005154516 A | 6/2005 |
| JP | 2005194537 A | 7/2005 |

(56) References Cited

FOREIGN PATENT DOCUMENTS

| | | |
|---|---|---|
| JP | 2005314552 A | 11/2005 |
| JP | 2005314748 A | 11/2005 |
| JP | 2006028593 A | 2/2006 |
| JP | 2006036688 A | 2/2006 |
| JP | 2006089742 A | 4/2006 |
| JP | 2006096979 A | 4/2006 |
| JP | 2006206810 A | 8/2006 |
| JP | 2006220328 A | 8/2006 |
| JP | 2006234291 A | 9/2006 |
| JP | 2007139363 A | 6/2007 |
| JP | 2008080634 A | 4/2008 |
| JP | 2008150477 A | 7/2008 |
| JP | 2010242071 A | 10/2010 |
| JP | 2011006528 A | 1/2011 |
| JP | 2011033333 A | 2/2011 |
| JP | 2011111511 A | 6/2011 |
| JP | 2011219622 A | 11/2011 |
| JP | 2011219627 A | 11/2011 |
| JP | 2011236098 A | 11/2011 |
| JP | 2011236099 A | 11/2011 |
| JP | 2011236377 A | 11/2011 |
| JP | 2012087222 A | 5/2012 |
| JP | 2012136672 A | 7/2012 |
| JP | 2013231109 A | 11/2013 |
| JP | 2014156544 A | 8/2014 |
| JP | 2018135443 A | 8/2018 |
| JP | 2019135278 A | 8/2019 |
| JP | 2019135281 A | 8/2019 |
| KR | 20100103953 A | 9/2010 |
| KR | 101156195 B1 | 6/2012 |
| KR | 101347906 B1 | 1/2014 |
| KR | 20140114614 A | 9/2014 |
| KR | 101815917 B1 | 1/2018 |
| KR | 101817728 B1 | 1/2018 |
| MX | 2011013990 A | 6/2012 |
| MX | 2015004252 A | 9/2016 |
| NL | 197303690 A | 9/1973 |
| PL | 401930 A1 | 6/2014 |
| PL | 406360 A1 | 6/2015 |
| RU | 16711 U1 | 2/2001 |
| RU | 2011151416 A | 6/2013 |
| SK | 28297 A3 | 4/1998 |
| TW | 261547 B | 11/1995 |
| TW | M484061 U | 8/2014 |
| WO | 1981001713 A1 | 6/1981 |
| WO | 1987000082 A1 | 1/1987 |
| WO | 1989004355 A1 | 5/1989 |
| WO | 1991011499 A1 | 8/1991 |
| WO | 1991018960 A1 | 12/1991 |
| WO | 1992001767 A2 | 2/1992 |
| WO | 1992004423 A2 | 3/1992 |
| WO | 1992009671 A1 | 6/1992 |
| WO | 1992022528 A2 | 12/1992 |
| WO | 1994010107 A1 | 5/1994 |
| WO | 1994010507 A1 | 5/1994 |
| WO | 1994013763 A1 | 6/1994 |
| WO | 1995003375 A1 | 2/1995 |
| WO | 1995032262 A1 | 11/1995 |
| WO | 1996000268 A1 | 1/1996 |
| WO | 1996012755 A1 | 5/1996 |
| WO | 1996023104 A1 | 8/1996 |
| WO | 1997001616 A1 | 1/1997 |
| WO | 1997006224 A1 | 2/1997 |
| WO | 1998044074 A1 | 10/1998 |
| WO | 1998045239 A1 | 10/1998 |
| WO | 2000006668 A1 | 2/2000 |
| WO | 2000047658 A1 | 8/2000 |
| WO | 2000053385 A1 | 9/2000 |
| WO | 2000053699 A1 | 9/2000 |
| WO | 2000064998 A1 | 11/2000 |
| WO | 2001003473 A1 | 1/2001 |
| WO | 2001048032 A1 | 7/2001 |
| WO | 2001060948 A1 | 8/2001 |
| WO | 2001062823 A1 | 8/2001 |
| WO | 2002022498 A1 | 3/2002 |
| WO | 2002031082 A1 | 4/2002 |
| WO | 2002072731 A1 | 9/2002 |
| WO | 2003029384 A1 | 4/2003 |
| WO | 2003042337 A2 | 5/2003 |
| WO | 2003047778 A1 | 6/2003 |
| WO | 2004011165 A1 | 2/2004 |
| WO | 2004018592 A1 | 3/2004 |
| WO | 2004072208 A1 | 8/2004 |
| WO | 2004076595 A1 | 9/2004 |
| WO | 2005040316 A2 | 5/2005 |
| WO | 2005087897 A1 | 9/2005 |
| WO | 2005097448 A1 | 10/2005 |
| WO | 2005097953 A1 | 10/2005 |
| WO | 2005108525 A1 | 11/2005 |
| WO | 2005111093 A1 | 11/2005 |
| WO | 2005121278 A1 | 12/2005 |
| WO | 2006043924 A1 | 4/2006 |
| WO | 2006096085 A1 | 9/2006 |
| WO | 2006096086 A1 | 9/2006 |
| WO | 2006124793 A2 | 11/2006 |
| WO | 2007009022 A2 | 1/2007 |
| WO | 2007014489 A1 | 2/2007 |
| WO | 2007050746 A1 | 5/2007 |
| WO | 2007091146 A1 | 8/2007 |
| WO | 2007115443 A1 | 10/2007 |
| WO | 2007143673 A1 | 12/2007 |
| WO | 2008030137 A1 | 3/2008 |
| WO | 2008075105 A1 | 6/2008 |
| WO | 2008079054 A2 | 7/2008 |
| WO | 2008126040 A2 | 10/2008 |
| WO | 2009064685 A2 | 5/2009 |
| WO | 2009087080 A2 | 7/2009 |
| WO | 2009099341 A2 | 8/2009 |
| WO | 2010049824 A2 | 5/2010 |
| WO | 2010053381 A1 | 5/2010 |
| WO | 2010106538 A1 | 9/2010 |
| WO | 2010106539 A2 | 9/2010 |
| WO | 2010116211 A1 | 10/2010 |
| WO | 2010130404 A1 | 11/2010 |
| WO | 2011008074 A1 | 1/2011 |
| WO | 2011008075 A1 | 1/2011 |
| WO | 2011009419 A1 | 1/2011 |
| WO | 2011025593 A1 | 3/2011 |
| WO | 2011028515 A2 | 3/2011 |
| WO | 2011034446 A1 | 3/2011 |
| WO | 2011079894 A2 | 7/2011 |
| WO | 2011127701 A1 | 10/2011 |
| WO | 2011131793 A1 | 10/2011 |
| WO | 2012006523 A1 | 1/2012 |
| WO | 2012014478 A1 | 2/2012 |
| WO | 2012014480 A1 | 2/2012 |
| WO | 2012018403 A1 | 2/2012 |
| WO | 2012110991 A1 | 8/2012 |
| WO | 2012127085 A1 | 9/2012 |
| WO | 2012129482 A2 | 9/2012 |
| WO | 2012131485 A1 | 10/2012 |
| WO | 2012162837 A1 | 12/2012 |
| WO | 2012172527 A2 | 12/2012 |
| WO | 2013032027 A1 | 3/2013 |
| WO | 2013036151 A2 | 3/2013 |
| WO | 2013070801 A1 | 5/2013 |
| WO | 2013087701 A1 | 6/2013 |
| WO | 2013089587 A1 | 6/2013 |
| WO | 2013106546 A1 | 7/2013 |
| WO | 2013119941 A1 | 8/2013 |
| WO | 2013123377 A1 | 8/2013 |
| WO | 2013171510 A1 | 11/2013 |
| WO | 2013187788 A2 | 12/2013 |
| WO | 2014032843 A1 | 3/2014 |
| WO | 2014041212 A1 | 3/2014 |
| WO | 2014043051 A1 | 3/2014 |
| WO | 2014051514 A1 | 4/2014 |
| WO | 2014057430 A1 | 4/2014 |
| WO | 2014070908 A1 | 5/2014 |
| WO | 2014135754 A1 | 9/2014 |
| WO | 2014167139 A2 | 10/2014 |
| WO | 2014177727 A1 | 11/2014 |
| WO | 2014184290 A1 | 11/2014 |
| WO | 2014200330 A1 | 12/2014 |

(56) References Cited

FOREIGN PATENT DOCUMENTS

| | | | |
|---|---|---|---|
| WO | 2015019313 A2 | 2/2015 | |
| WO | 2015082755 A2 | 6/2015 | |
| WO | 2015162505 A2 | 10/2015 | |
| WO | 2015194978 A1 | 12/2015 | |
| WO | 2016030460 A1 | 3/2016 | |
| WO | 2016034739 A1 | 3/2016 | |
| WO | 2016187144 A1 | 11/2016 | |
| WO | 2016209194 A1 | 12/2016 | |
| WO | 2017009208 A1 | 1/2017 | |
| WO | WO-2017009208 A1 * | 1/2017 | ............ C10L 1/1883 |
| WO | 2017060464 A1 | 4/2017 | |
| WO | 2017088015 A1 | 6/2017 | |
| WO | 2017113020 A1 | 7/2017 | |
| WO | 2017115261 A1 | 7/2017 | |
| WO | 2017152205 A1 | 9/2017 | |
| WO | 2017168164 A1 | 10/2017 | |
| WO | 2017172351 A2 | 10/2017 | |
| WO | 2017173006 A2 | 10/2017 | |
| WO | 2017198896 A1 | 11/2017 | |
| WO | 2017205275 A1 | 11/2017 | |
| WO | 2018000050 A1 | 1/2018 | |
| WO | 2018084330 A1 | 5/2018 | |
| WO | 2018085934 A1 | 5/2018 | |
| WO | 2018104443 A1 | 6/2018 | |
| WO | WO-2018104443 A1 * | 6/2018 | ............ C10G 1/002 |
| WO | 2019236779 A1 | 12/2019 | |
| WO | 2020178597 A1 | 9/2020 | |
| WO | 2020178599 A1 | 9/2020 | |
| WO | 2020212315 A1 | 10/2020 | |
| WO | 2022212502 A1 | 10/2022 | |

OTHER PUBLICATIONS

EP1380635B1 English Translation (Year: 2013).*
Bhagat, Vishal et al. "Extraction of Fuel from Plastic Waste," International Journal of Pollution and Noise Control. 2020, 6(1), pp. 7-9.
Borthakur, A. et al. "Alkyl Fumarate-Vinyl Acetate Copolymer as Flow Improver for High Waxy Indian Crude Oils," Energy & Fuels (1996) 10(3), pp. 844-848.
Lin, Y.-H et al. "A combined kinetic and mechanistic modelling of the catalytic degradation of polymers," Journal of Molecular Catalysis A: Chemical (2001) 171(1-2), pp. 143-151.
Lin, Y.-H et al. "A novel approach for the kinetic and mechanistic modeling of acid-catalyzed degradation of polymers," Asia-Pacific Journal of Chemical Engineering (2009) 4(2), pp. 147-153.
Lin, Y.-H et al. "Catalytic conversion of commingled polymer waste into chemicals and fuels over spent FCC commercial catalyst in a fluidised-bed reactor," Applied Catalysis B: Environment (2007) 69(3-4), pp. 145-153.
Lin, Yeuh-Hui et al. "Recycling of dual hazardous wastes in a catalytic fluidizing process," Catalysis Today (2011) 174 (1), pp. 37-45.
Lopez, A. et al. "Pyrolysis of municipal plastic wastes II: Influence of raw material composition under catalytic conditions," Waste Management (2011) 31, pp. 1973-1983.
Mariella, R.P. et al. "A Novel Sn1 Displacement: The Reaction of Tertiary Amines with Acetic Anhydride," Canadian Journal of Chemistry (1971) 49, pp. 3348-3351.
Meszaros, Mark W. "Advances in Plastics Recycling Thermal Depolymerization of Thermoplastic Mixtures," ACS Symposium Series (1995), 609(Plastics, Rubber, and Paper Recycling), pp. 170-182.
Miandad, R. et al. "Catalytic pyrolysis of plastic waste: A review," Process Safety and Environment Protection (2016) 102, pp. 822-838.
Miskolczi, N. et al. "Chemical Recycling of Waste Polyethylene and Polypropylene," Petroleum and Coal (2003) 45 (3-4), pp. 125-130.
Miskolczi, Norbert et al. "Hydrocarbon Mixtures from Waste Polymer Degradation," Progress in Rubber, Plastics and Recycling Technology (2004) 20(1), pp. 51-68.
Missau, Juliano et al. "Development of a nanostructured filter for pyrolysis wax purification: Effects of particulate filter aids," Particuology (2021) 54, pp. 164-172.
Moinuddin, Sarker et al. "High density polyethylene (HDPE) waste plastic conversion into alternative fuel for heavy vehicles," Journal of Environmental Research and Development (2012) 7(1), pp. 1-9.
Montrikool, O. et al. "Effects of maleic anhydride on degradation of PVC during pyrolysis," Journal of Analytical and Applied Pyrolysis. 2005, 73, pp. 77-84.
Nishino, Junya et al. "Development of a feedstock recycling process for converting waste plastics to petrochemicals," Ishikawajima-Harima Giho (2004) 44(1), pp. 325-332.
Ondruschka, Bernd et al. "Conversion of mixtures of pyrolysis feedstocks and thermochemical pre-treated plastic wastes. An alternative of raw material plastics recycling," Chemische Technik (Leipzig) (1995) 47(4), pp. 171-179, with English abstract.
Panda, Achyut Kumar, PhD Thesis, Jul. 2011, "Studies on process optimization for production of liquid fuels from waste plastics," Department of Chemical Engineering, National Institute of Technology, Rourkela, Odisha 769008, India. 216 pages, divided into five sections.
Pasquali, Ricardo C. et al. "Some considerations about the hydrophilic-lipophilic balance system," International Journal of Pharmaceutics (2008) 356, pp. 44-51.
PCT International Search Report and Written Opinion for PCT/US2018/067597, Mar. 20, 2019, 15 pages.
PCT International Search Report and Written Opinion for PCT/US2019/040944, Sep. 25, 2019, 10 pages.
PCT International Search Report and Written Opinion for PCT/US2021/049790, Dec. 3, 2021, 15 pages.
PCT International Search Report and Written Opinion for PCT/US2022/046428, Jan. 26, 2023, 17 pages.
International Searching Authority Written Opinion for PCT/US2022/019813, Sep. 21, 2023, 8 pages.
Pradipta, Ilham Zulfa et al. "High Grade Liquid Fuel from Plastic Waste Pyrolysis Oil by Colum Distillation," 2019 IEEE Conference on Energy Conversion, Oct. 16-17, 2019 Yogyakarta, Indonesia, pp. 240-244.
Raheem, A.B. et al. "The conversion of post-consumer polyethylene terephthalate (PET) into a thermosetting polyester resin," Archives of Applied Science Research (2010) 2(4), pp. 240-254.
Sakata, Yusaku et al. "Development of a catalystic dehaologenation (CI, Br) process for municipal waste plastic-derived oil," Journal of Material Cycles and Waste Management (2003) 5, pp. 113-124.
Sanchez-Rodriguez, Daniel et al. "Inhibition effect of amine compounds derived from hardening agents on the extraction of hydrogen bromide by water from the pyrolysis oil of brominated printed circuit boards," Journal of Cleaner Production (2020) 265, pp. 1-10.
Aguado, J. et al. "Feedstock recycling of polyethylene in a two-step thermo-catalytic reaction system," Journal of Analytical Applied Pyrolysis (2007) 79, pp. 415-423.
Ali, Mohammad Farhat et al. "The Conversion of Waste Plastics/Petroleum Residue Mixtures to Transportation Fuels," Feedstock Recycling and Pyrolysis of Waste Plastics. Edited by John Scheirs. Chichester, UK: John Wiley & Sons Ltd., (2006) pp. 363-380.
Al-Salem, S.M. et al. "The valorization of plastic solid waste (PSW) by primary to quaternary routes: From re-use to energy and chemicals," Progress in Energy and Combustion Science (2010) 36, pp. 103-129.
Al-Shafey, H.I. et al. "Studies on the Influence of Long Chain Acrylic Esters Co-Polymers Grafted With Vinyl Acetate as Flow Improver Additives of Crude Oils," Advances in Applied Science Research. 2011, 2(5) pp. 476-489.
Angyal, Andras et al. "Petrochemical feedstock by thermal cracking of plastic waste," Journal of Analytical Applied Pyrolysis (2007) 79, pp. 409-414.
Arabiourrutia, Miriam et al. "Pyrolysis of Polyolefins in a Conical Spouted Bed Reactor: A Way to Obtain Valuable Products," Pyrolysis, Chapter 12. Rijeka, Croatia: InTech (2017) pp. 285-304.
Ashiri, Masafumi "Use of Supercritical Water as Reaction Solvent," Kagaku Sochi (1999) 41(2), pp. 31-36, with English abstract.

(56) References Cited

OTHER PUBLICATIONS

Aurich, H.-P. Marl "Pyrolyse, Hydrierung, Gaserzeugung," (Pyrolysis, Hydrogenation, Gasification), Kautschuk Gummi Kunststoffe (1994) 47(8), pp. 596-601, with English abstract.
Bhaskar, Thallada et al. "Thermal degradation of ABS-Br mixed with PP and catalytic debromination by iron oxide carbon composite catalyst (Fe-C)," Green Chemistry (2002) 4(6), pp. 603-606.
Buekens, Alfons et al. "Technical Methods in Plastics Pyrolysis," Macromolecular Symposa. 1998, 135, pp. 63-81.
Datta, Janusz et al. "Thermo-Chemical Decomposition Study of Polyurethane Elastomer Through Glycerolysis Route with Using Crude and Refined Glycerine as a Transesterification Agent," Journal of Polymers and the Environment (2018) 26(1), pp. 166-174.
De la Puente, Gabriela et al. "Recycling polystyrene into fuels by means of FCC: performance of various acidic catalysts," Applied Catalysis, B: Environmental (1998) 19(3,4), pp. 305-311.
Desai, J.D. "Plastic Waste Recycling Technologies—Ecofriendly Solution," Chemical Engineering World. 1999, 34(11), pp. 73-81.
Ding, Kuan et al. "Improving hydrocarbon yield from catalytic fast co-pyrolysis of hemicellulose and plastic in the dual-catalyst bed of CaO and HZSM-5," Bioresource Technology (2018) 261, pp. 86-92.
Dobo, Zsolt et al. "Transportation fuel from plastic wastes: Production, purification and SI engine tests," Energy (2019) 189, pp. 1-9.
El-Gamal, I.M. et al. "Nitrogen-based copolymers as wax dispersants for paraffinic gas oils," Fuel. 1998, 77(5) pp. 375-385.
Ercole, Piero et al. "Minimizing the environmental impact of Vehicles End of Life glass recycling," Verre (Paris, France). 2008,14(1) pp. 32-38.
Gala, Alberto et al. "Characterization and Distillation of Pyrolysis Liquids Coming from Polyolefins Segregated of MSW for Their Use as Automotive Diesel Fuel," Energy & Fuels (2020) 34, pp. 5969-5982.
Gebauer, Manfred et al. "Olefine aus Altkunststoffen" (Olefins from waste plastics), Chemische Technik (1995) 47(4), pp. 196-199, with English abstract.
Ghosh, Pranab et al. "Dodecyl methacrylate and vinyl acetate copolymers as viscosity modifier and pour point depressant for lubricating oil," International Journal of Industrial Chemistry (2017) 8, pp. 197-205.
Hajekova, Elena et al. "Recycling of low-density polyethylene and polypropylene via copyrolysis of polyalkene oil/waxes with naphtha: product distribution and coke formation," Journal of Analytical and Applied Pyrolysis (2005) 74 (1-2), pp. 270-281.
Hofmann, U. et al. "Rohstoffrecycling—ein Weg zum Verwerten von Altkunststoffen," (Raw materials recycling—an approach to the reuse of scrap plastics) Kunststoffe (1993) 83(4), pp. 259-263, with English abstract.
Kaminsky, W. "Recycling of mixed plastics by pyrolysis in a fluidised bed," Macromolecular Symposia (2000) 152, pp. 191-199.
Kaminsky, W. et al. "Feedstock recycling of polymers by pyrolysis in a fluidised bed," Polymer Degradation and Stability (2004) 85(3), pp. 1045-1050.
Ke-Jian, Liao et al. "A Study on Three Kinds of Alcohols Esterified Copolymer of Maleic Anhydride and Olefins as Pour-Point Depressant for Diesels," Petroleum Science and Technology (1998) 16(9,10), pp. 971-977.
Kim, Su Jin "Comparison of Dimethylformamide with Dimethylsulfoxide for Quality Improvement of Distillate Recovered from Waste Plastic Pyrolysis Oil," Processes (2020) 8(1024), pp. 1-10.
Kodera, Yoichi et al. "Continuous-Distribution Kinetic Model for Macromolecular Conversion: Asphaltene and Polymer," Preprints of Symposia—American Chemical Society, Division of Fuel Chemistry (1998), 43(3), pp. 658-662.
Krishna, R. et al. "Correlation of Pour Point of Gas Oil and Vacuum Gas Oil Fractions with Compositional Parameters," Energy & Fuels. 1989, 3(1), pp. 15-20.
Lach, Christian "Chemical recycling: Turning plastic waste into chemical feedstock," BASF Research Press Conference Dec. 10, 2020, 9 pages.
Lange, Jean-Paul "Sustainable development: efficiency and recycling in chemicals manufacturing," Green Chemistry (2002) 4(6), pp. 546-550.
Lehner, Markus et al. "Prozesskette zum stofflichen Recycling von Kunststoffabfallen (Process Chain for the Material Recycling of Post-Consumer Plastic)," BHM (2016) 161(6), pp. 246-251, with English abstract.
Leube, Walter et al. "Wax-Crystal Modification for Fuel Oils by Self-Aggregating Partially Crystallizable Hydrocarbon Block Copolymers," Energy & Fuels. 2000, 14(2), pp. 419-430.
Sarker, Moinuddin et al. "A new technology proposed to recycle waste plastics into hydrocarbon fuel in USA," International Journal of Energy and Environment (2012) 3(5), pp. 749-760.
Schleiffer, Andreas "Synthetic Crude Oil from Petroleum Waste Materials," Preprints of Papers—American Chemical Society, Division of Fuel Chemistry (1994) 39(4), pp. 1060-1064.
Serrano, D.P. et al. "Conversion of low density polyethylene into petrochemical feedstocks using a continuous screw kiln reactor," Journal of Analytical and Applied Pyrolysis (2001) 58-59, pp. 789-801.
Siddiqui, Mohammad Nahid et al. "Useful Liquid Products from the Pyrolysis of Mixed Plastics," Preprints of Papers—American Chemical Society, Division of Fuel Chemistry (2007) 52(2), pp. 761-762.
Singh, Thokchom Subhaschandra et al. "A lab scale waste to energy conversion study for pyrolysis of plastic with and without catalyst: Engine emissions testing study," Fuel (2020) 277, pp. 1-10.
Sojak, L. et al. "GC-MS of Polyethylene and Polypropylene Thermal Cracking Products," Petroleum & Coal (2006) 48 (1), pp. 1-14.
Soldi, Rafael A. et al. "Polymethacrylates: Pour point depressants in diesel oil," European Polymer Journal. 2007, 43, pp. 3671-3678.
Song, Yuping et al. "Study on the relationship between the structure and activities of alkyl methacrylate—maleic anhydride polymers as cold flow improvers in diesel fuels," Fuel Processing Technology. 2005, 86, pp. 641-650.
Soni, Hemant P. et al. "Performance-Based Designing of Wax Crystal Growth Inhibitors." Energy & Fuels. 2008, 22(6), pp. 3930-3939.
Sonwane, H.W. et al. "Desulfurization of Pyrolysis Oil Obtained from Plastic Waste by Using Adsorption Method," International Research Journal of Engineering and Technology (IRJET) (2017) 4(7), pp. 1248-1251.
Srivastava, S.P, et al. "Flow Improvers and Paraffin Dispersants of Fuels," Fuels and fuel-additives (2014) pp. 243-253.
Tasheva, Yordanka et al. "Possibilities for Purification of Pyrolysis Oil to Obtain Ecological Products," Annual of Assen Zlatarov University, Burgas, Bulgaria (2011) 40, pp. 62-65.
Thahir, Ramli et al. "Production of liquid fuel from plastic waster using integrated pyrolysis method with refinery distillation bubble cap plate column," Energy Reports (2019) 5, pp. 70-77.
Turemuratov et al. (2015) "Synthesis and Properties of Depressators Based on Sopolymers in the Presence of Gossypol Pitch", Oriental Journal of Chemistry, 31(3), pp. 1447-1453.
Vasile, Cornelia et al. "Feedstock recycling from plastic and thermoset fractions of used computers (I): pyrolysis," Journal of Material Cycles and Waste Management (2006) 8, pp. 99-108.
Vouvoudi, Evangelia C. et al. "Pyrolytic degradation of common polymers present in packaging materials," Journal of Thermal Analysis and Calorimetry (2019) 138, pp. 2683-2689.
Williams, P.T. et al. "Recycling plastic waste by pyrolysis," Journal of the Institute of Energy (1998) 71, pp. 81-93.
Williams, Paul T. "Yield and Composition of Gases and Oils/Waxes from the Feedstock Recycling of Waste Plastic," Feedstock Recycling and Pyrolysis of Waste Plastics: Converting Waste Plastics into Diesel and Other Fuels. Edited by John Scheirs. Chichester, UK: John Wiley & Sons Ltd., (2006) pp. 285-313.
Wiriyaumpaiwong, Songchai et al. "Distillation of Pyrolytic Oil Obtained from Fast Pyrolysis of Plastic Wastes," Energy Procedia (2017) 138, pp. 111-115.

(56) References Cited

OTHER PUBLICATIONS

Xu, Jun et al. Synthesis of Poly(maleic acid alkylamide-co-r-olefin-co-styrene) Co-polymers and Their Effect on the Yield Stress and Morphology of Waxy Gels with Asphaltenes, Energy & Fuels. 2011, 25, pp. 573-579.

Xu, Shannan et al. "Synergistic effects of catalytic co-pyrolysis of macroalgae with waste plastics," Process Safety and Environmental Protections (2020) 137, pp. 34-48.

Xue et al. (2016) "The influence of polymethyl acrylate as a pour point depressant for biodiesel", Energy Sources, Part A: Recovery, Utilization, and Environmental Effects, 39(1), pp. 17-22.

Yang, Bing et al. "Research and Application Development of Highly Loaded Degradable Plastic Products," Suliao (2014) 43(4), pp. 39-42, with English abstract.

Zabarnick, Steven et al. "Studies of Urea Treatment on the Low-Temperature Properties of Jet Fuel," Energy & Fuels. 2002, 16(6), pp. 1565-1570.

Zahedi, Ali Reza et al. "Unsaturated polyester resin via chemical recyclying of off-grade poly(ethylene terephthalate)," Polymer International (2009) 58, pp. 1084-1091.

Zassa, M. Della et al. "Two-steps selective thermal depolymerization of polyethylene. 1: Feasibility and effect of devolatilization heating policy," Journal of Analytical and Applied Pyrolysis (2010) 87, pp. 248-255.

Zhang, Huiyan et al. "Catalytic pyrolysis of black-liquor lignin by co-feeding with different plastics in a fluidized bed reactor," Bioresource Technology (2015) 192, pp. 68-74.

\* cited by examiner

Typical IR absorptions (cm$^{-1}$)

Aromatic C-H Stretch ~3030 (v)
Aromatic C-H Bending 860 - 680 (s)
Aromatic C=C Bending 1700 -1500 (m,m)

Amide N-H Stretch 3700 - 3500 (m)

Amide C=O Stretch 1690 -1630 (s)

Carboxylic Acid C=O Stretch 1780 -1710 (s) O-H Stretch 3000 - 2500 (broad, v)

Alkyl C-H Stretch 2950 - 2850 (m or s)

*FIG. 4A (Continued)*

ANTIFOULING AGENTS FOR PLASTIC-DERIVED SYNTHETIC FEEDSTOCKS

FIELD OF APPLICATION

The application is directed at antifouling agents used in the production of synthetic feedstocks derived from plastics.

BACKGROUND

Post-consumer plastic and off-specification plastic materials can be chemically recycled by heating these plastic materials in a pyrolysis reactor, which breaks the polymer chains into smaller, volatile fragments. The vapors from the reactor are condensed and recovered as pyrolysate or pyrolysis oil, while the smaller, non-condensable hydrocarbon fragments are recovered as fuel gas.

During recovery of the pyrolysate, foulants such as black or brown residue or tar-like substances, which are insoluble in the pyrolysis oil, accumulate and foul the process equipment: distillation towers, pumps, process piping, filters, and the like. The deposition of foulant, which accumulates over time, eventually requires shutdown of the equipment for cleaning.

When pyrolysate (pyrolysis oil) is stored for extended time periods, the storage containers can also accumulate foulant in the form of a film. The brownish-black film forms with or without the presence of air (oxygen). The film can form at room temperature over longer time periods (e.g., week-long) but film formation is accelerated at increased temperature.

SUMMARY

Described herein are compositions and methods for dispersing foulants from pyrolysis oil obtained from plastic.

In one aspect of the application is a method of reducing or preventing fouling in a plastic-derived synthetic feedstock composition, the method comprising:
  adding antifouling agents comprising a carboxylic acid anhydride or a copolymer of a dicarboxylic acid anhydride and alpha olefin to a synthetic feedstock composition derived from plastic pyrolysis containing foulant to provide treated pyrolysate.

In another aspect is a composition comprising a synthetic feedstock derived from plastic wherein the synthetic feedstock is obtained by the method of:
  (a) heating plastic under substantially oxygen free conditions at a temperature from about 400° C. to about 850° C. to produce a pyrolysis effluent; and
  (b) cooling and condensing the pyrolysis effluent to obtain a synthetic feedstock;
  (c) recovering the synthetic feedstock;
  (d) adding antifouling agents to the synthetic feedstock composition to provide a treated synthetic feedstock; and
  (e) separating the treated synthetic feedstock to obtain a synthetic feedstock with reduced foulant.

In yet another aspect is a treated synthetic pyrolysate comprising a synthetic feedstock and foulant and an antifouling agent, wherein the antifouling agent is a carboxylic acid anhydride or a polymer comprising a dicarboxylic acid anhydride and alpha olefin.

DETAILED DESCRIPTION

Figure 1:
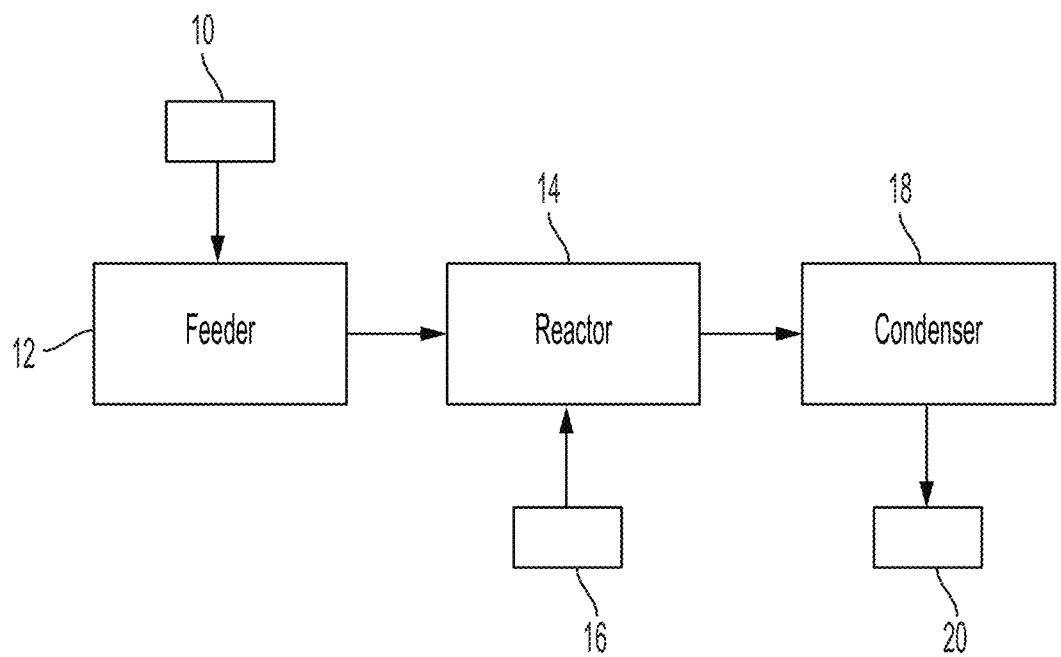
FIG. 1 is a schematic representation of an embodiment of a plastic pyrolysis process.

Although the present disclosure provides references to various embodiments, persons skilled in the art will recognize that changes may be made in form and detail without departing from the spirit and scope of the application. Various embodiments will be described in detail with reference to the figures. Reference to various embodiments does not limit the scope of the claims attached hereto. Additionally, any examples set forth in this application are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the present application. All publications, patent applications, patents and other references mentioned herein are incorporated by reference in their entirety.

As used herein, the term "foulant" means organic and inorganic materials that deposit on equipment during the operation and manufacturing of synthetic feedstock or accumulate during storage (e.g., after the processing of the synthetic feedstock).

As used herein, the term "process equipment" means distillation towers, pumps, process piping, filters, condensers, quench towers or columns, storage equipment and the like that are associated with the process and which may be subject to fouling. This term also includes sets of components which are in fluidic or gas communication.

As used herein, the term "synthetic feedstock" refers to hydrocarbons obtained from treatment or processes on plastics, such as thermochemical conversion of plastics (e.g., pyrolysis oil or pyrolysate).

As used herein, the term "optional" or "optionally" means that the subsequently described event or circumstance may but need not occur, and that the description includes instances where the event or circumstance occurs and instances in which it does not.

As used herein, any recited ranges of values contemplate all values within the range and are to be construed as support for claims reciting any sub-ranges having endpoints which are real number values within the recited range. By way of example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

The terms "polymer," "copolymer," "polymerize," "copolymerize," and the like include not only polymers comprising two monomer residues and polymerization of two different monomers together, but also include (co)polymers comprising more than two monomer residues and polymerizing together more than two or more other monomers. For example, a polymer as disclosed herein includes a terpolymer, a tetrapolymer, polymers comprising more than four different monomers, as well as polymers comprising, consisting of, or consisting essentially of two different monomer residues. Additionally, a "polymer" as disclosed herein may also include a homopolymer, which is a polymer comprising a single type of monomer unit.

Unless otherwise indicated, an "alkyl" group as described herein alone or as part of another group is an optionally substituted linear or branched saturated monovalent hydrocarbon substituent containing from, for example, one to about sixty carbon atoms, such as one to about thirty carbon atoms, in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., arylene) denote optionally substituted homocyclic aromatic groups, such as monocyclic or bicyclic groups containing from about 6 to about 12 carbons in the ring portion, such as phenyl, biphenyl, naphthyl, substituted phenyl, substituted biphenyl or substituted naphthyl. The term "aryl" also includes heteroaryl functional groups. It is understood that the term "aryl" applies to cyclic substituents that are planar and comprise 4n+2n electrons, according to Huckel's Rule.

"Cycloalkyl" refers to a cyclic alkyl substituent containing from, for example, about 3 to about 8 carbon atoms, preferably from about 4 to about 7 carbon atoms, and more preferably from about 4 to about 6 carbon atoms. Examples of such substituents include cyclopropyl, cyclobutyl, cyclopentyl, cyclohexyl, cycloheptyl, cyclooctyl, and the like. The cyclic alkyl groups may be unsubstituted or further substituted with alkyl groups, such as methyl groups, ethyl groups, and the like.

"Heteroaryl" refers to a monocyclic or bicyclic 5- or 6-membered ring system, wherein the heteroaryl group is unsaturated and satisfies Huckel's rule. Non-limiting examples of heteroaryl groups include furanyl, thiophenyl, pyrrolyl, pyrazolyl, imidazolyl, 1,2,3-triazolyl, 1,2,4-triazolyl, isoxazolyl, oxazolyl, isothiazolyl, thiazolyl, 1,3,4-oxadiazol-2-yl, 1,2,4-oxadiazol-2-yl, 5-methyl-1,3,4-oxadiazole, 3-methyl-1,2,4-oxadiazole, pyridinyl, pyrimidinyl, pyrazinyl, triazinyl, benzofuranyl, benzothiophenyl, indolyl, quinolinyl, isoquinolinyl, benzimidazolyl, benzoxazolinyl, benzothiazolinyl, quinazolinyl, and the like.

Compounds of the present disclosure may be substituted with suitable substituents. The term "suitable substituent," as used herein, is intended to mean a chemically acceptable functional group, preferably a moiety that does not negate the activity of the compounds. Such suitable substituents include, but are not limited to, halo groups, perfluoroalkyl groups, perfluoro-alkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C═O)— groups, heterocylic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxy-carbonyl groups, alkylsulfonyl groups, and arylsulfonyl groups. In some embodiments, suitable substituents may include halogen, an unsubstituted $C_1$-$C_{12}$ alkyl group, an unsubstituted $C_4$-$C_6$ aryl group, or an unsubstituted $C_1$-$C_{10}$ alkoxy group. Those skilled in the art will appreciate that many substituents can be substituted by additional substituents.

The term "substituted" as in "substituted alkyl," means that in the group in question (i.e., the alkyl group), at least one hydrogen atom bound to a carbon atom is replaced with one or more substituent groups, such as hydroxy (—OH), alkylthio, phosphino, amido (—CON($R_A$)($R_B$), wherein $R_A$ and $R_B$ are independently hydrogen, alkyl, or aryl), amino (—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like.

When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

Described are compositions and methods that reduce or eliminate foulants in synthetic feedstocks derived from plastics. Some foulants in the synthetic feedstock process do not thermally decompose or volatize at temperatures as high as 600° C. Treating such synthetic feedstock with the antifouling agents as described herein have been found to reduce or eliminate foulants. Such treated synthetic feedstocks show reduced fouling of equipment and systems used in plastic recycling and during storage.

Various plastic types such a thermoplastic waste can be used to recycle plastics. The types of plastics commonly encountered in waste-plastic feedstock include, without limitation, low-density polyethylene, high-density polyethylene, polypropylene, polystyrene and the like, and combinations thereof. In some embodiments, the synthetic feedstock comprises pyrolysis of plastic comprising polyethylene, polypropylene, polystyrene, polyethylene terephthalate and combinations thereof. In some embodiments, while polyethylene, polypropylene and lesser amounts of polystyrene are present, polyvinylchloride and polyethylene terephthalate are present due to sorting difficulties.

Several processes are known in which plastic (e.g., waste plastic) is converted to lower molecular weight hydrocarbon materials particularly to hydrocarbon fuel materials. For example, see U.S. Pat. Nos. 6,150,577; 9,200,207; and 9,624,439; each of these publications are incorporated herein by reference in their entireties. Such processes broadly described include breaking the long-chain plastic polymers by thermochemical conversion, such as pyrolysis—high heat (e.g., from 400° C.-850° C.) with limited or no oxygen and above atmospheric pressure. The pyrolysis temperatures can be reduced when catalysts are used. Pyrolysis conditions include a temperature from about 400° C.-850° C., from about 500° C.-700° C., or from about 600° C.-700° C. The resultant pyrolysis effluent is condensed and then optionally distilled.

Figure 2:
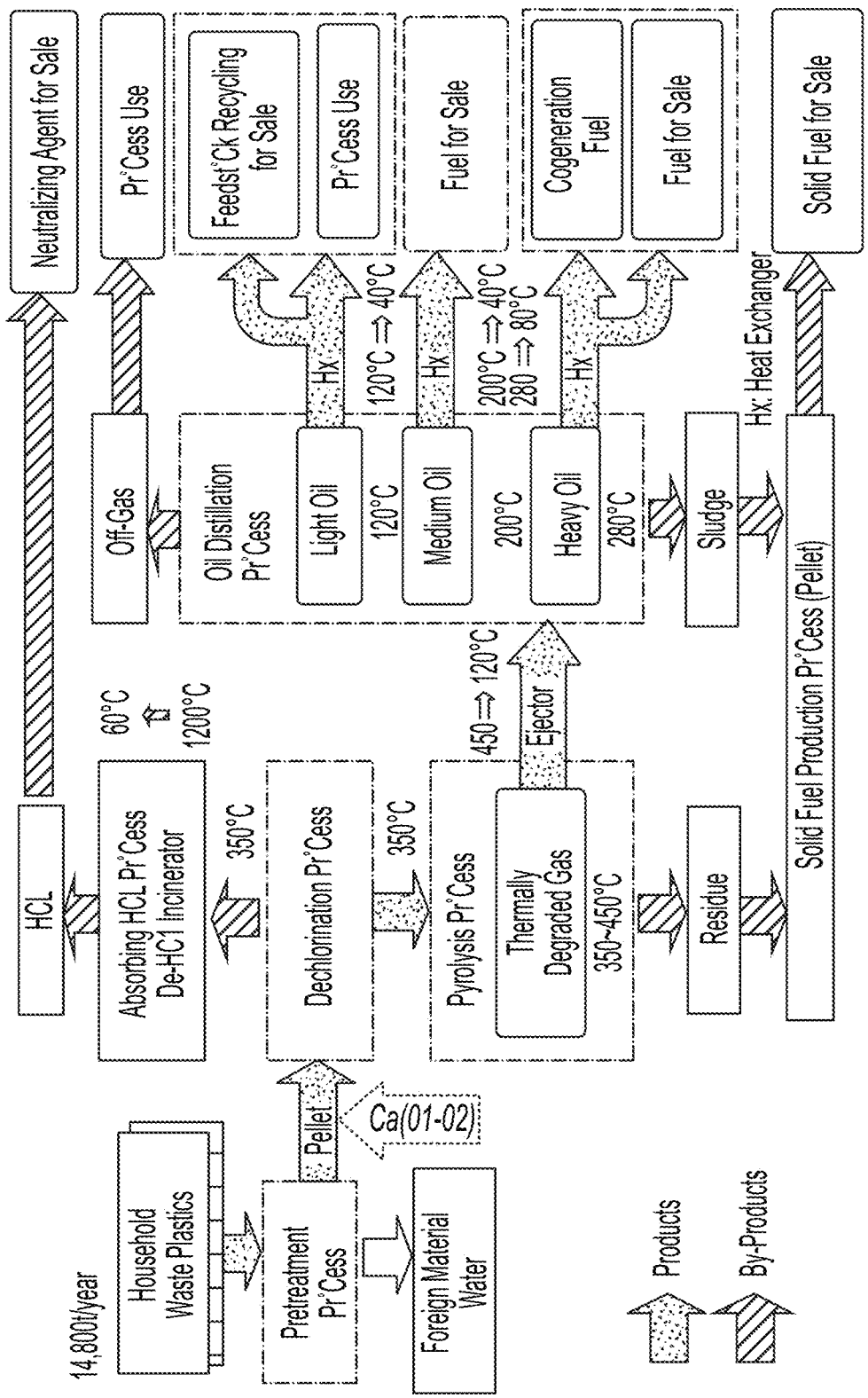
FIG. 2 is a schematic representation of an embodiment of a plastic pyrolysis process.
Figure 3:
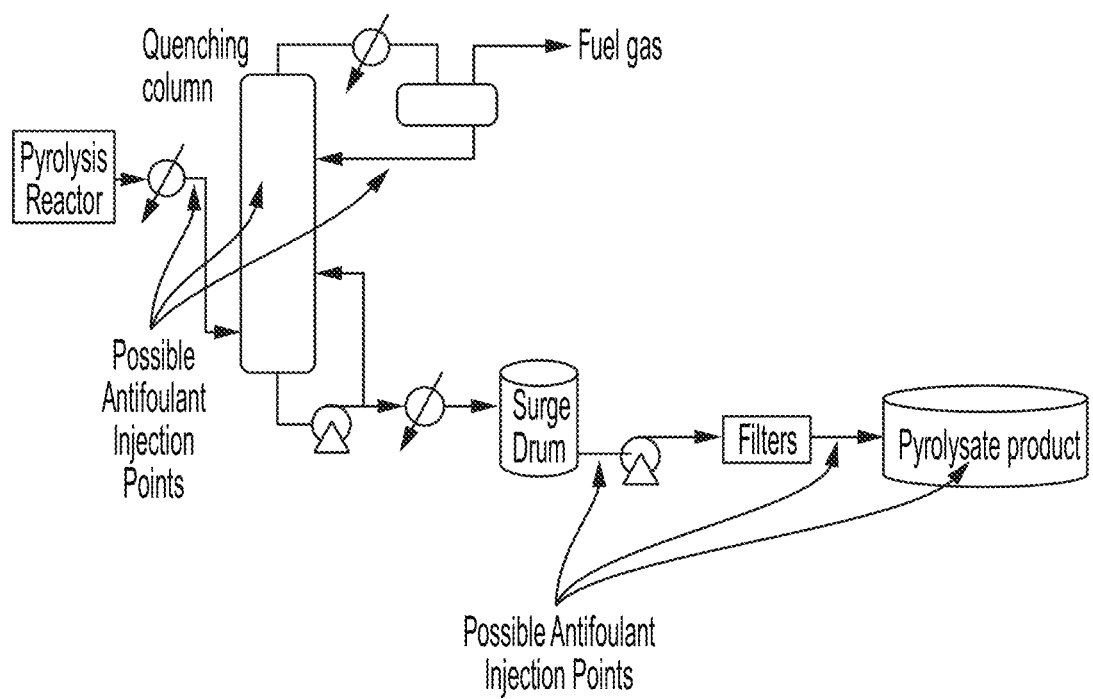
FIG. 3 is a schematic representation of an embodiment of a plastic pyrolysis process showing treatment with antifouling agents.

As shown in FIG. 1, an embodiment of a pyrolysis process includes a feeder 12 of waste plastic, a reactor 14, and a condenser system 18. Polymer-containing material is fed through inlet 10 in the feeder, and heat is applied to reactor 14. An outlet 20 from condenser system 18 allows for the product to exit. FIG. 2 depicts another embodiment of a pyrolysis process for plastic. FIG. 3 depicts yet another embodiment showing the process after the condensing or quenching of the pyrolysis effluent. The thermal cracking reactors to accomplish this pyrolysis reaction have been described in detail in a number of patents, e.g., U.S. Pat. Nos. 9,624,439; 10,131,847; 10,208,253; and PCT International Pat. Appl. Pub. No. WO 2013/123377A1, each of these publications incorporated herein by reference in their entireties.

In some embodiments, the method of obtaining the synthetic feedstock comprises:
(a) heating plastic under substantially oxygen free conditions at a temperature from about 400° C. to about 850° C. to produce a pyrolysis effluent;
(b) condensing the pyrolysis effluent to obtain a synthetic feedstock; and
(c) recovering the synthetic feedstock.

In some embodiments, the method of obtaining the synthetic feedstock is in the presence or absence of catalysts. In some embodiments, after condensing, the effluent is optionally distilled. In some embodiments, recovering synthetic feedstock relates to separating or quenching or both separating and quenching the pyrolysis effluent to obtain the synthetic feedstock.

The pyrolysis process produces a range of hydrocarbon products from gases (at temperatures from 10° C. to 50° C. and 0.5-1.5 atmospheric pressure and having 5 carbons or less); modest boiling point liquids (like gasoline or naptha (40-200° C.) or diesel fuel (180-360° C.); a higher (e.g., at 250-475° C.) boiling point liquid (oils and waxes), and some solid residues, commonly referred to as char. Char is the material that is left once the pyrolytic process is complete and the reactor effluent is recovered. Char contains the additives and contaminants that enter the system as part of the feedstock. The char can be a powdery residue or substance that is more like sludge with a heavy oil component. Glass, metal, calcium carbonate/oxide, clay and carbon black are just a few of the contaminants and additives that will remain after the conversion process is complete and become part of the char.

In some embodiments, the pyrolysis reaction results 2-30% gas (C1-C4 hydrocarbon); (2) 10-50% oil (C5-C15 hydrocarbon); (3) 10-40% waxes (≥C16 hydrocarbon); and (4) 1-5% char. After completion of the pyrolysis process the pyrolysate or pyrolysis oil can range from 60-80 wt. % C5-C15, 20-35 wt. % C16-C29 and 5 wt. % or less ≥C30. In some embodiments the pyrolysate or pyrolysis oil can range from 70-80 wt. % C5-C15, 20-35 wt. % C16-C29.

The hydrocarbons that are obtained from the pyrolysis of waste plastic are a mixture of alkanes, alkenes, olefins and diolefins or polyenes; the olefin group is generally between C1 and C2, viz., alpha-olefin, some alk-2-ene is also produced, the diene is generally in the alpha and omega position, viz. alk-α,ω-diene or can be conjugated dienes. In some embodiments, the pyrolysis of plastic produces paraffin compounds, isoparaffins, olefins, diolefins, naphthenes and aromatics. In some embodiments, the percentage of 1-olefins in the pyrolysis effluent is from 25 to 75 wt. %; or from 35-65 wt. %. In some embodiments the synthetic feedstocks are 25-70 wt. % olefins and diolefins; 35-65 wt. % olefins and diolefins, 35-60 wt. % olefins and diolefins; or 5-50 wt. % olefins and diolefins.

Depending on the processing conditions synthetic feedstock can have characteristics similar to crude oil from petroleum sources but may have varying amounts of olefins and diolefins. In some embodiments, the synthetic feedstock derived from waste plastic contains 35-65% olefins and diolefins, 10-50% paraffins and iso-paraffins, 5-25% naphthenes, and 5-35% aromatics. In some embodiments, the synthetic feedstocks have carbon lengths of 15-20 wt. % C9-C16; 75-87 wt. % C16-C29; 2-5 wt. % C30+, where the carbon chains are predominantly a mixture of alkanes, alkenes and diolefins. In other embodiments, the synthetic feedstocks have 10 wt. %<C12, 25 wt. % C12-C20, 30 wt. % C21-C40 and 35 wt. %>C41 where the carbon chains are predominantly a mixture of alkanes, alkenes and diolefins. In still other embodiments, the synthetic feedstocks have 60-80 wt. % C5-C15, 20-35 wt. % C16-C29, and 5 wt. % or less ≥C30, where the carbon chains are predominantly a mixture of alkanes, alkenes and diolefins. In some embodiments, the synthetic feedstocks have 70-80 wt. % C5-C15 and 20-35 wt. % C16-C29 where the carbon chains are predominantly a mixture of alkanes, alkenes and diolefins.

In some embodiments, the synthetic feedstock composition has a range of alpha or omega olefin monomer constituents (e.g., alpha olefin or alpha, omega diolefin) which can react and precipitate from the synthetic feedstock composition at a temperature greater than its desired temperature or during storage, transport, or use temperature.

When pyrolysis oil (pyrolysate) is stored for extended time periods, the storage container begins to accumulate a film. This film forms with or without the presence of air (oxygen). The film formation is accelerated at increased temperature, but it will form at room temperature over time.

In some embodiments, the foulant in the synthetic feedstock is a tar like deposit or is a film like foulant and combinations thereof. In some embodiments, the tar like deposit is a solid viscoelastic substance, and a dark brown or black viscous liquid, which each result from the pyrolysis of waste plastic. In some embodiments, the tar like deposit is a suspension of tiny black particles in dark brown or black viscous liquid, which has the consistency of soft artist modeling clay. In some embodiments the tar like deposits and film have the same infrared spectroscopic characteristics.

In some embodiments, the foulant (e.g., as a solid viscoelastic substance) includes polyamides with additional carboxylic acid and hydroxyl functional groups and have an elemental composition of 62-75% carbon, 6-9% hydrogen, 3-7% nitrogen and 12-25% oxygen. In some embodiments, the elemental composition of the foulant is 62-75% carbon, 6-9% hydrogen, 3-7% nitrogen and 12-25% oxygen and less than 0.3% sulfur. In some embodiments, the foulant present in the pyrolysis oil is a secondary amide, which also contains hydroxyl and carbonyl functional groups beyond those associated with the amide functional group. In some embodiments, the foulant is a polyamide, with long chain aliphatic groups, carboxylic acid groups, amide groups, aromatic groups with minor amounts of olefinic unsaturation and combinations thereof. Foulant analysis is by using a two-step gas chromatography/mass spectrometry (GC/MS) technique, with the first step being GC/MS of the volatile components collected by thermal desorption and the second step being GC/MS of the volatile by-products resulting from pyrolysis of the non-volatile fraction of the foulant. In some embodiments, the first step reveals that the foulant is a polyamide, with long chain aliphatic groups, carboxylic acid groups, amide groups, aromatic groups with olefinic unsaturation, alkenes, alkanes, benzoic acid, caprolactam, toluene, xylene, cresol, phenol, isopropylphenol, tert-butylphenol and di-tert butyl phenol, dimethylphenol, napthalenol, varying lengths of alkenes and alkanes and combinations thereof. While the second step reveals that the major fragments identified were propylene, toluene, caprolactam, pentene and butane. Minor fragments included tetramethylindole, ethylbenzene, ethyldimethylpyrorole, dimethylfuran, and tetrahydroquinoline. In some embodiments, the foulant comprises nylon, polyvinyl chlorides (PVC), polyethylene terephthalate (PET), polyamides, caprolactam, benzoic acid, phenol, p-cresol, dimethylphenol, isopropyl phenol, tert-butylphenol, dimethylethylphenol, napthalenol, varying lengths of alkenes and alkanes, propylene, tolune, pentene, butane, tetramethylindole, ethylbenzene, ethyldimethylpyrrole, dimethylfuran, tetrahydroquinoline and combinations thereof.

To the pyrolysate process stream or pyrolysate product is added the antifouling agent, which reduces or prevents foulant formation or deposition in the pyrolysate or process equipment. In some embodiments, the antifouling agent is an anhydride of carboxylic acids or their derivatives. In some embodiments, the carboxylic acid anhydrides include succinic anhydride, maleic anhydride, acetic anhydride, phthalic anhydride, benzoic anhydride, acrylic and methacrylic anhydride, and derivatives thereof.

In some embodiments, the antifouling agent is a succinic anhydride of the general formula I:

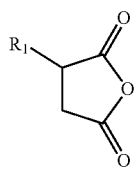

Formula I wherein $R_1$ is a hydrogen or 8 to 36 carbon atoms, and from 12 to 24 carbon atoms, where $R_1$ can be straight chained, or branched, or a combination of both structures. In some embodiments, $R_1$ is an aliphatic alkyl or alkenyl group containing from 8 to 36 carbon atoms. In some embodiments, $R_1$ is an aliphatic, straight alkenyl chain of 8 to 36 carbon atoms.

In some embodiments, the succinic anhydride compounds include succinic acid, succinamides, succinimides, and N-alkyl, N-alkenyl, N-aryl, and N-alkaryl succinimides or alkenyl succinic anhydrides. The succinic anhydride compounds include tridecylsuccinic anhydride, pentadecylsuccinic anhydride, tetradecenylsuccinic anhydride, hexadecenylsuccinic anhydride, dodecylsuccinic anhydride, tetradecylsuccinic anhydride, hexadecylsuccinic anhydride, octadecenylsuccinic anhydride, docosenylsuccinic anhydride, and mixtures thereof. In some embodiments, the antifouling agent is a succinic anhydride, an alkenyl succinic anhydride. In some embodiments, the antifouling agent is a selected from dodecenyl succinic anhydride (DDSA) also referred to as tetrapropenyl succinic anhydride (TPSA), maleic anhydride and alpha olefin copolymers or combinations thereof.

In some embodiments the antifouling agent is a polymer. In some embodiments the polymer is a polymerized copolymer of an unsaturated or saturated monomer and olefins. In some embodiments, the olefin is an alpha olefin having the structure shown as formula II:

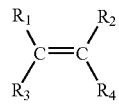

Formula II wherein $R_1$, $R_2$, $R_3$, and $R_4$ are independently selected from hydrogen and $C_5$-$C_{60}$ alkyl, with the proviso that at least two thereof are hydrogen; a blend of two or more such alpha olefin monomers having formula (I) are suitably included in the copolymer. In some embodiments $R_1$, $R_2$, $R_3$, and $R_4$ are independently hydrogen or $C_{12}$-$C_{60}$. The maleic anhydride monomer has the formula III:

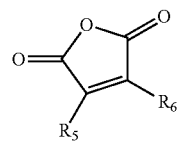

Formula III wherein $R_5$ and $R_6$ are each independently selected from hydrogen or an alpha olefin as described above or styrene.

In some embodiments, the alpha-olefin has 10 to 36 carbons, or 14 to 32 carbons, or 18 to 30 carbons, or 24 to 28 carbons wherein the number of carbons is an average number, reflecting a blend of compounds, or a substantially single value, as determined by the user. The polymer comprises a weight ratio of the α-olefin residues to maleic anhydride residues of about 1:1 to about 1:5. The weight average molecular weight ($M_r$) of the copolymer is from about 5,000 g/mol to about 100,000 g/mol, 5,000 g/mol to about 25,000 g/mol, and from about 5,000 g/mol to about 15,000 g/mol when analyzed by gel permeation chromatography. The copolymer is synthesized using conventional techniques, e.g., radical addition polymerization principles and techniques familiar to those of skill in the art of polymer synthesis. The polymer is further analyzed using conventional methodology familiar to the polymer chemist, including gel permeation chromatography and infrared analysis, to ensure target structure and molecular weight are achieved in the precursor polymer.

The antifouling agent can be in the form of a concentrate that includes about 15 wt. % to 90 wt. % of the antifouling agent, as described above, or about 15 wt. % to 85 wt. %, or about 15 wt. % to 80 wt. %, or about 15 wt. % to 75 wt. %, or about 15 wt. % to 70 wt. %, or about 15 wt. % to 65 wt. %, or about 15 wt. % to 60 wt. %, or about 15 wt. % to 55 wt. %, or about 15 wt. % to 50 wt. %, or about 15 wt. % to 45 wt. %, or about 15 wt. % to 40 wt. %, or about 15 wt. % to 35 wt. %, or about 15 wt. % to 30 wt. %, or about 15 wt. % to 25 wt. %, or about 20 wt. % to 80 wt. %, or about 30 wt. % to 50 wt. %, or about 50 wt. % to 90 wt. %, or about 50 wt. % to 80 wt. %.

The antifouling agent is effective to reduce or prevent fouling when the antifouling agent composition is added to a synthetic pyrolysis stream or synthetic pyrolysis product in an amount corresponding to about 10 ppm to 5000 ppm by weight of the antifouling agent, or about 10 ppm to 1000 ppm, 900 ppm to 5,000 ppm, or about 10 ppm to 500 ppm, or about 20 ppm to 500 ppm, or about 30 ppm to 500 ppm, or about 40 ppm to 500 ppm, or about 50 ppm to 500 ppm, or about 60 ppm to 500 ppm, or about 70 ppm to 500 ppm, or about 80 ppm to 500 ppm, or about 90 ppm to 500 ppm, or about 100 ppm to 500 ppm, or about 400 ppm to 5000 ppm, or about 5 ppm to 450 ppm, or about 5 ppm to 400 ppm, or about 5 ppm to 350 ppm, or about 5 ppm to 300 ppm, or about 5 ppm to 250 ppm, or about 5 ppm to 200 ppm, or about 5 ppm to 150 ppm, or about 5 ppm to 100 ppm, or about 10 ppm to 300 ppm, or about 10 ppm to 250 ppm, or about 50 ppm to 250 ppm, or about 50 ppm to 200 ppm, or about 100 ppm to 200 ppm, or about 100 ppm to 5000 ppm by weight to form a treated synthetic pyrolysis stream or treated synthetic pyrolysis product.

A treated synthetic pyrolysis stream includes a total of about 10 ppm to 5000 ppm by weight of the antifouling agent composition. A treated synthetic pyrolysis product is a product including a total of about 10 ppm to 5000 ppm by weight of the antifouling agent. A treated synthetic pyrolysis process stream is a synthetic pyrolysis product disposed in synthetic pyrolysis processing equipment and including a total of about 10 ppm to 5000 ppm by weight of the antifouling agent composition.

In some embodiments, the treated synthetic pyrolysis process streams undergo substantially less fouling of contacted synthetic pyrolysis processing equipment during one or more synthetic pyrolysis processing operations than the corresponding untreated synthetic pyrolysis process stream. Reduction or prevention of fouling is observed within one or more synthetic pyrolysis process streams, during disposal of the treated synthetic pyrolysis process stream within one or more petroleum process apparatus, or during storage of a synthetic pyrolysis product within a storage vessel.

Thus, disclosed herein is a method of reducing fouling in one or more synthetic pyrolysis process streams, the method including, consisting essentially of, or consisting of applying about 10 ppm to 5000 ppm by weight or by volume of the antifouling agent to a synthetic pyrolysis process stream to form a treated synthetic pyrolysis process stream. The antifouling agent composition comprises, consists essentially of, or consists of a combination of one or more antifouling agent or antifouling agent polymers, wherein the antifouling agent is a tetrapropylene succinic anhydride and the antifouling agent polymer is a reaction product of a maleic anhydride- and an alpha olefin. Any of the compositions described above are useful in conjunction with the method of reducing fouling, wherein the method includes applying about 10 ppm to 5000 ppm by weight or by volume of the antifouling agent composition to a synthetic pyrolysis process stream to form a treated synthetic pyrolysis process stream.

The antifouling agents are useful in preventing or reducing deposition of foulant in process equipment such as quench towers or columns used in synthetic feedstock production processes. In some embodiments, the antifouling agents are added during production of the synthetic feedstock, to feedstock held in storage (refined or unrefined) or combinations thereof. The antifouling agents may be added at one or more locations in the process. In some embodiments, the antifouling agents are added at the point where the gaseous pyrolysate begins to condense and the antifouling agents are allowed to travel with the condensed pyrolysate and achieve contact with the foulant that has settled or would otherwise settle in the absence of antifouling agents. In some embodiments, the antifouling agents are added to the inlets or outlets of the quenching tower or to the storage of the pyrolysate product or to the quenching tower or column and pyrolysate product storage or drum. For example, the antifouling agents are added to points in the process as shown in FIG. 3.

In some embodiments, the antifouling agents are added at the inlet of a quenching tower or column or air-cooled or water-cooled condenser when the synthetic feedstock vapor leaving a pyrolysis reactor is quenched and the gases are cooled and condensed at a temperature from 100° C.-200° C. or 110° C.-140° C. or from 105° C. to 120° C. In some embodiments, the antifouling agents are added to a synthetic feedstock held in storage.

In certain embodiments, a filtration step may be carried out before and/or after any of the locations mentioned above. A filtration step may be useful in such embodiments where an antifouling agent interacts with a film-forming components to make an adduct. In some pyrolysis oils, these adducts are soluble but in certain pyrolysis oils, the adducts are insoluble. In such cases, for example, the antifouling agent may prevent the adhesion of the film-forming components to a storage vessel. In an illustrative embodiment, the filtration step is carried out after formation of the pyrolysis oil and/or after addition of the antifouling agent but before further processing of the pyrolysis oil.

The antifouling agents may be added by any suitable method. For example, the antifouling agents may be added in neat or with an adjuvant. In some embodiments, the adjuvant is solvent or other dispersants (e.g., surfactants). In some embodiments, the antifouling agents may be applied as a solution that is sprayed, dripped or injected into a desired opening within a system or onto the process equipment or the fluid contained therein. The antifouling agents can be added continuously, intermittently, or batch-wise to the process equipment as required.

The antifouling agents are applied to process equipment to form a treated process equipment. In some embodiments, treated process equipment can be observed to undergo less foulant deposition than process equipment without addition of the antifouling agents.

Reduction or prevention in the foulant formation or deposition can be evaluated by any known method or test such as for example ASTM D4625. In some embodiments the synthetic feedstocks treated with the antifouling agents have foulant contamination reduced by about 5% to 95%; 5% to 75%; 5% to 50%; 5% to 25%; 5% to 15%; 50% to 95%; 50% to 20%; or 50% to 75%.

Other additives can be added to the pyrolysis oil during processing and storage. In some embodiments, the other additives are antioxidants, paraffin inhibitors, asphaltene dispersants, wax dispersants, tar dispersants, neutralizers, surfactants, biocides, preservatives, or any combination thereof. In some embodiments, the other additives are antioxidants, pour point depressants or extraction solvents or combinations thereof that are added to the pyrolysis oil. For example, antioxidants added include antioxidants reported in U.S. Provisional Application No. 63/159,266, pour point depressants reported in U.S. Provisional Application No. 63/078,111, and extraction solvents reported in U.S. Provisional Application No. 63/168,643. The reported applications are each incorporated herein by reference in their entireties.

EXAMPLES

The following examples are intended to illustrate different aspects and embodiments of the invention and are not to be considered limiting the scope of the invention. It will be recognized that various modifications and changes may be made without departing from the scope of the claims.

Example 1. Foulant Characterizations

An elemental (CHNS) analysis was conducted on a sample of foulant film obtained from pyrolysis oil. The film was separated from the pyrolysis oil and washed with heptane and further dissolved in dichloromethane. The dichloromethane was evaporated leaving the foulant residue.

Table 1 shows the CHNS analysis.

TABLE 1

| Element | Weight percent |
|---|---|
| Carbon | 63 |
| Hydrogen | 7.7 |
| Nitrogen | 6.8 |
| Sulfur | Less than 0.3 |
| Oxygen* | 22 |

*Oxygen by 100% minus sum of quantified elements

Foulant samples from different pyrolysis sources were also evaluated by infrared (IR) spectroscopy. The IR spectrum was evaluated using a Nicolet iS50 FTIR, equipped with an on-board diamond internal reflection accessory. The spectrum was run at four wavenumber resolutions, and was the result of 32 co-added scans.

Figure 4A:
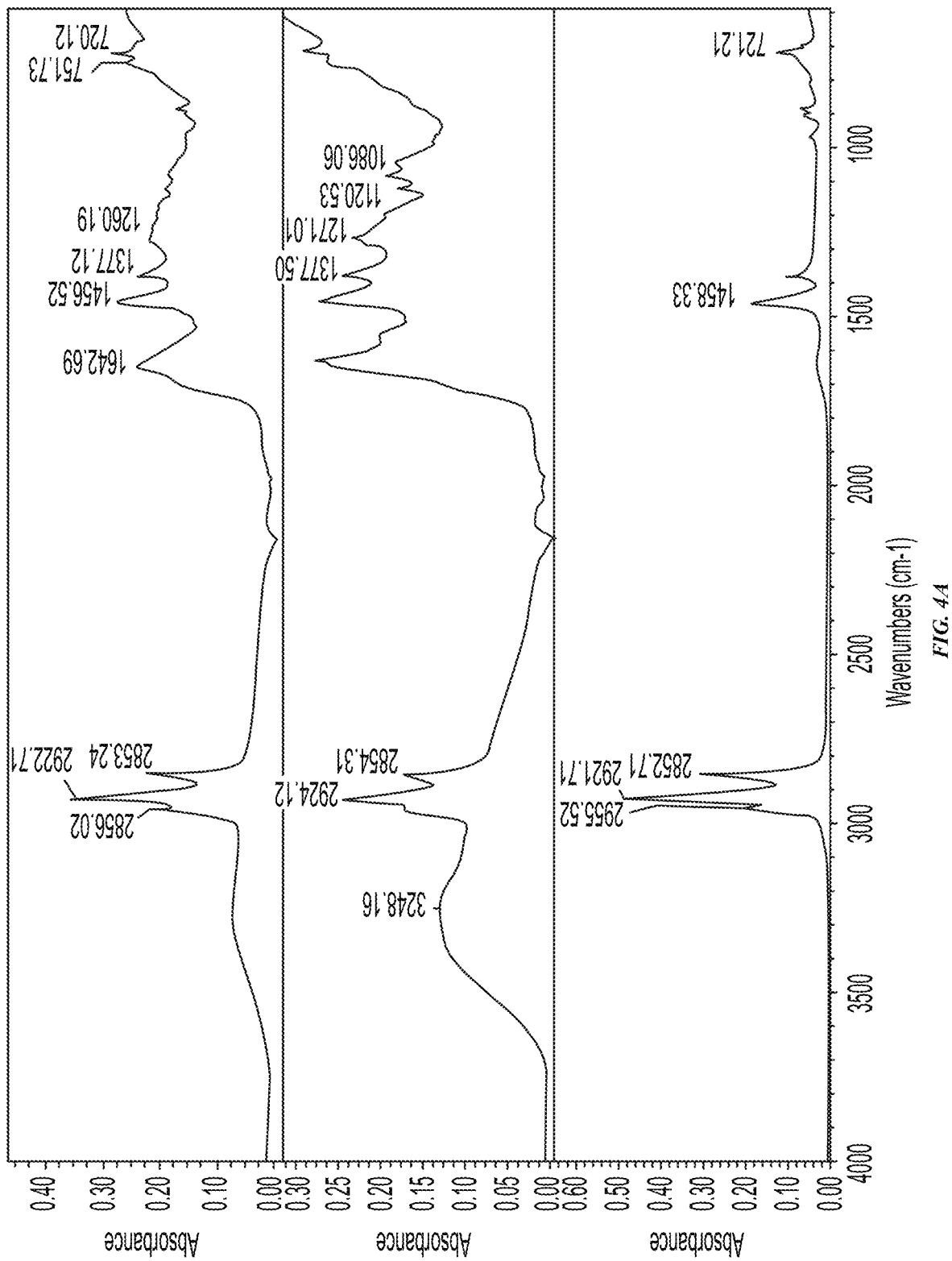
FIGS. 4A and 4B shows infrared spectra for different foulant containing samples.
Figure 4B:
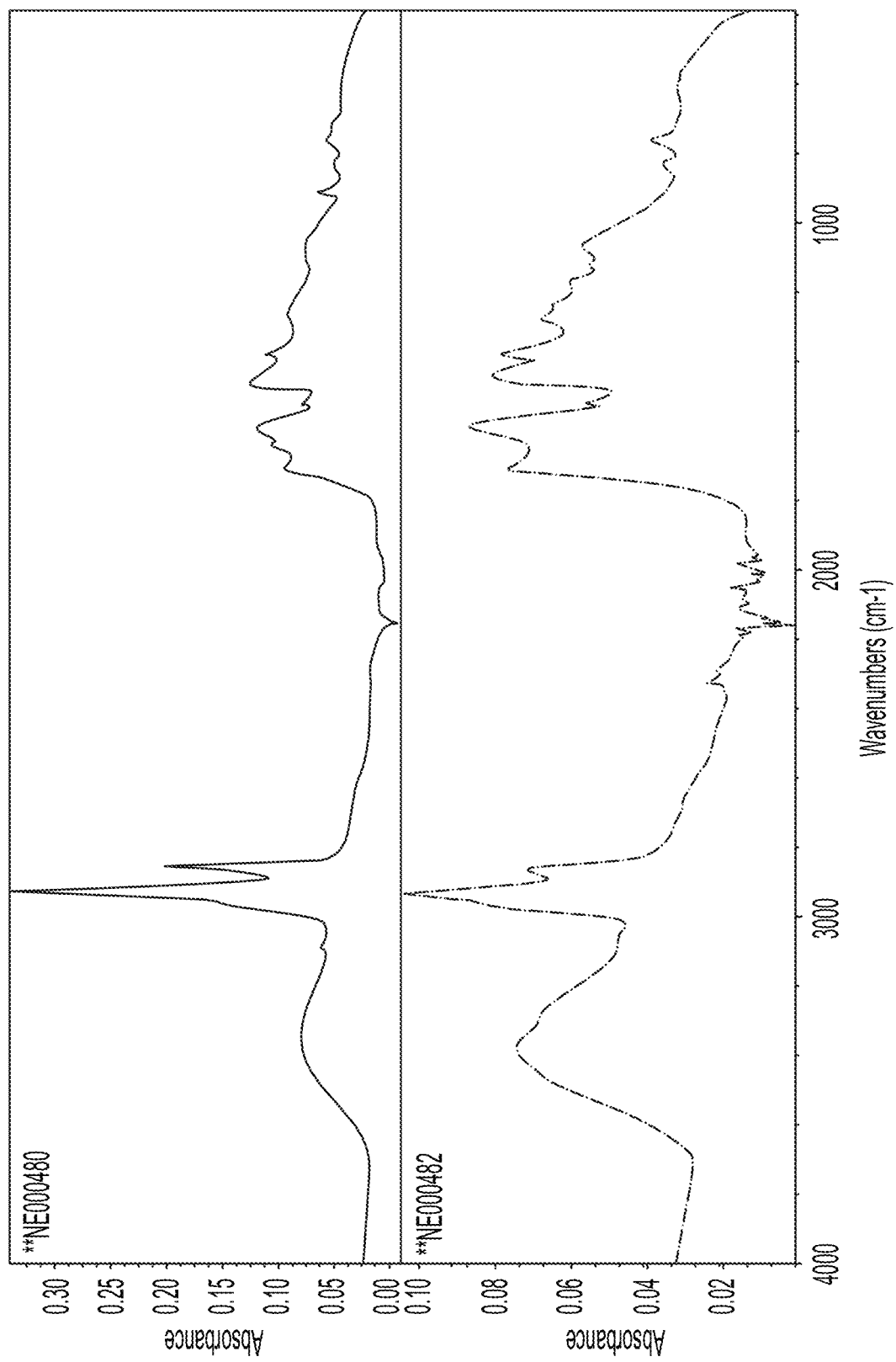

IR spectroscopy showed the presence of long chain aliphatic groups, carboxylic acid groups, amide groups, aromatic groups with minor amounts of olefinic unsaturation. The major component of the foulant was a secondary amide (e.g., polyamides). See FIG. 4 which shows that the foulants in the various samples showed similar compositions with some variation in the amounts of aliphatic hydrocarbons, carboxylic acids, amides, and aromatic compounds, among the group. The foulant composition within a sample showed similar compositions at different temperatures.

The thermal profiles of various pyrolysis samples from different sources were analyzed by Evolved Gas Analysis. The samples were heated at 600° C. The volatile fraction of the samples was thermally desorbed from 40° C. to 300° C., chromatographically separated by gas chromatography, and detected by mass spectrometry.

Figure 5:
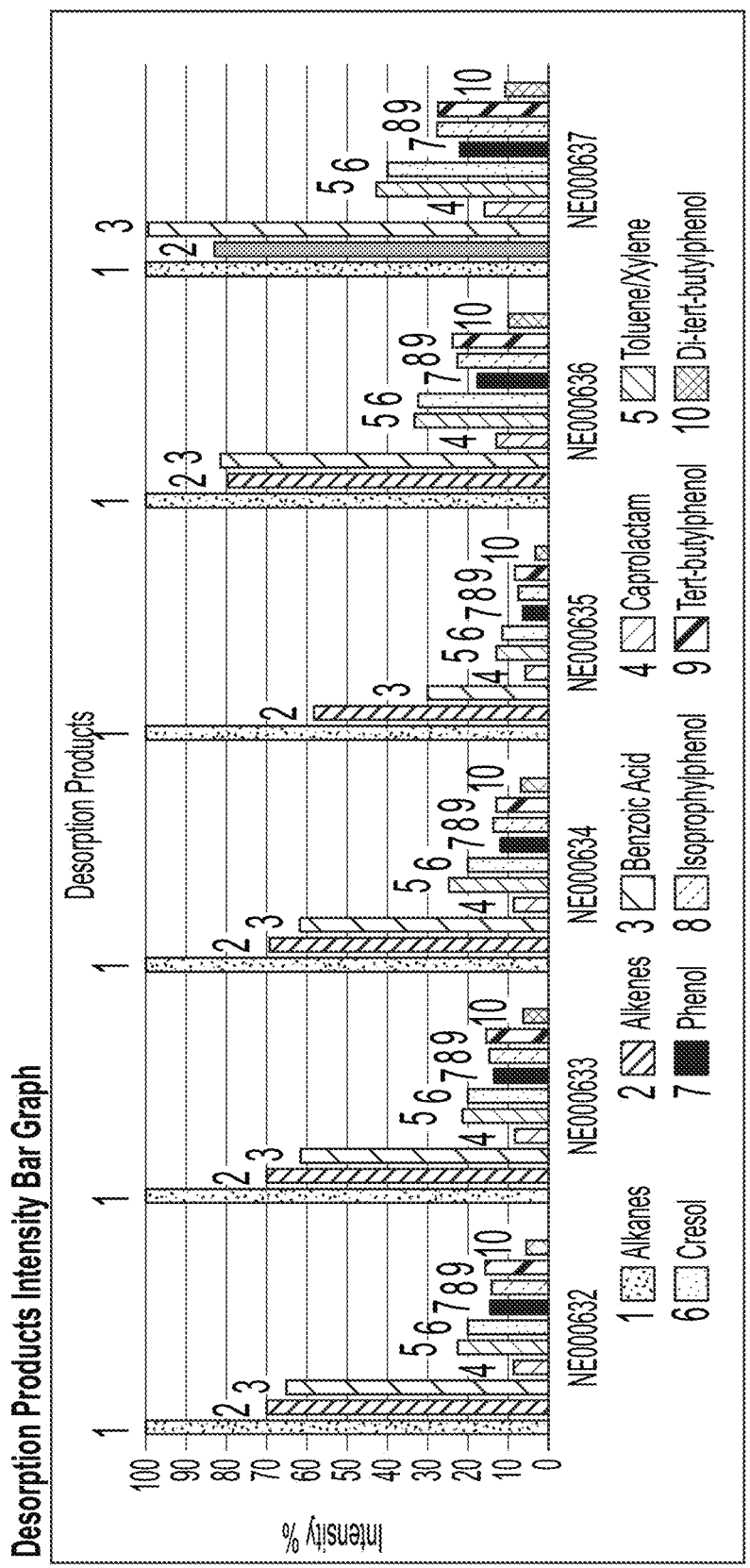
FIG. 5 is a bar graph of the desorption products for various films obtained after storage at various temperatures. The film-foulant samples are designated as follows: NE00632=Blank pyrolysate without nitrogen @ 25° C.; NE00633=Blank pyrolysate with nitrogen @ 25° C.; NE00634=Blank without nitrogen @ 43° C.; NE00635=Blank with nitrogen @ 43° C.; NE00636=Blank pyrolysate without nitrogen @ 75° C.; NE00637=Blank with nitrogen @ 75° C.
Figure 6:
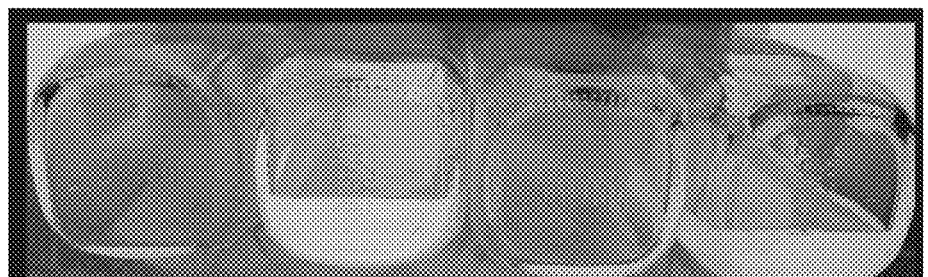
FIG. 6 is a digital photograph showing effect of embodiments of antifouling agents on film or residue formation after 30 days of stability testing. Low=200 ppm and high=1000 ppm.
Figure 6:
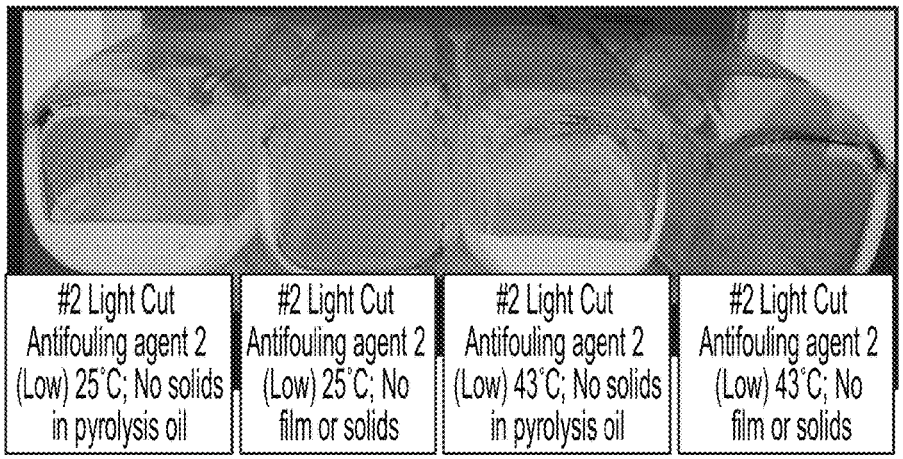
Figure 6:
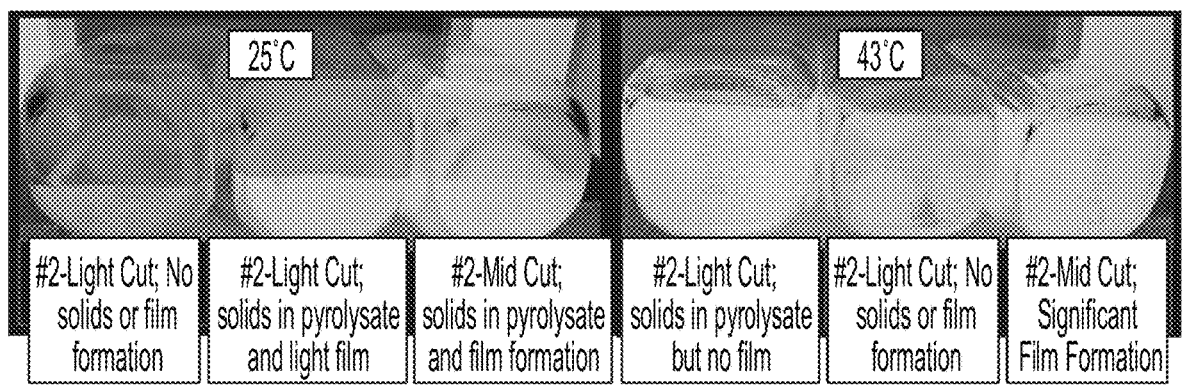

FIG. 5 shows the Evolved Gas Analysis and desorption products of foulant from pyrolysates. The volatile components identified showed a predominance of caprolactam with minor amounts of benzoic acid, phenol, p-cresol, dimethylphenol, isopropyl phenol, tert-butylphenol, dimethylethylphenol, napthalenol and varying lengths of alkenes and alkanes. Heating of the sample at 600° C. thermally decomposes the sample into various fragments. The major fragments identified were propylene, tolune, caprolactam, pentene and butane. Minor fragments included tetramethylindole, ethylbenzene, ethyldimethylpyrrole, dimethylfuran, and tetrahydroquinoline.

Example 2. Stability of Foulants from Plastic Pyrolysis

The stability of the synthetic feedstocks was evaluated in the presence or absence of various antifouling agents: antifouling agent 1 (15% Maleic anhydride—C24-C28 alpha-olefin copolymer CAS No. 68459-79-0) or antifouling agent 2 (Tetrapropylene-Succinic Anhydride CAS No. 26544-38-7) at varying concentrations and at different temperatures. The stability was tested by ASTM D4626 (storage at 25° C. and 43° C. for 4 weeks). Untreated samples (no addition of antifouling agent) at 25° C. and 43° C. served as controls.

The antifouling agents were tested on various pyrolysis feedstocks: pyrolysis feedstock sample 1 (60-80 wt. % C5-C15, 20-35 wt. % C16-C29 and 5 wt. % or less C30); and pyrolysis feedstock sample 2 (70-80 wt. % C5-C15, 20-35 wt. % C16-C29). The pyrolysis feedstocks treated with various antifouling agents were recovered and divided into several portions for stability testing at 25° C. or 43° C. for a one-month period following ASTM D4625 procedural guidelines. Samples were observed for one month at elevated temperatures and 3 months at room temperature. Storage stability results with antifouling agent 1 and antifouling agent 2 are shown in Table 2.

TABLE 2

| Feedstock Sample No. | Antifouling agent Type | Antifouling agent Concentration (ppm) | Antifouling agent Actives (ppm) | Temperature ° C. | Observation at 30 days |
|---|---|---|---|---|---|
| 1 | 1 | 1000, 2000 | 150, 300 | 25 | 2000 ppm no film on storage container |
| 1 | 1 | 1000, 2000 | 150, 300 | 43 | 2000 ppm no film on storage container up to 16 days; but film obtained after 30 days |
| 2 | 1 | 1000, 2000, 3000 | 150, 300, 450 | 25 | no film on storage container but solids in pyrolysate |
| 2 | 1 | 1000, 2000, 3000 | 150, 300, 450 | 43 | no film on storage container but solids in pyrolysate |
| 2 | 2 | 200, 1000 | 200, 1000 | 25 | 200, 1000 ppm- no films and no solids |
| 2 | 2 | 200, 1000 | 200, 1000 | 43° | 200 ppm- no films and no |

TABLE 2-continued

| Feedstock Sample No. | Antifouling agent Type | Antifouling agent Concentration (ppm) | Antifouling agent Actives (ppm) | Temperature ° C. | Observation at 30 days |
|---|---|---|---|---|---|
| | | | | | solid; 1000 ppm mild film or chemical |

Example 3. Thermogravimetric Analysis

Thermo-gravimetry analyses (TGA) of the films formed after stability testing of various pyrolysates were conducted to determine the thermal decomposition temperatures (Td) and residue analyses. The non-volatile matter after the TGA study to 600° C. were quantified and shown in Table 3. The TGA was conducted in inert gas (e.g., $N_2$) to minimize the formation of oxidative byproducts (combustion).

TABLE 3

| Sample # | Temperature (° C.) | Residue 1 | Residue 2 | Residue 3 | Residue 4 | Residue 5 |
|---|---|---|---|---|---|---|
| Antifouling Agent (Control) | | 99.22% residue at 129° C. | 76.30% residue by 242° C. | 70.34% residue at 284° C. | 5.41% residue at 453° C. | 4.76% residue at 590° C. |
| 1 | 25° C. | 99.6% by 100° C. | | | 25.1% residue by 550° C. | 24.2% residue at 600° C. |
| 1 | 43° C. | 97.5% by 83° C. | | 91.1% by 160° C. | 33.9% by 488° C. | 31.1% by 600° C. |
| 1 | 43° C. | 98.0% residue by 75° C. | | | 26.4% residue at 525° C. | 25.1% residue at 600° C. |
| 1 | 25° C. | | 58.27% by 240° C. | | 12.85% by 510° C. | 10.66% by 600° C. |
| 2 | 25° C. | 91.5% by 75° C. | | | 18.90% by 525° C. | 17.7% by 600° C. |
| 2 | 25° C. | | 48.12% by 240° C. | | 10.29% by 500° C. | 4.81% by 600° C. |
| 2 | 25° C. | | | | 14.91% by 500° C. | 8.37% by 600° C. |
| 2 | 43° C. | | 69.95% by 247° C. | | 15.36% by 500° C. | 11.67% by 600° C. |
| 2 | 43° C. | | 51.89% by 250° C. | | 9.25% by 500° C. | 8.37% by 600° C. |

By 600° C. all the samples show ~90% decomposition or volatilization. However, 18-31% of films or residue do not volatilize at temperatures up to 600° C. In other words, the films or residue do completely volatilize in the convection section. The films composition (e.g., primarily caprolactam, aromatics) determines the non-volatility in the TGA experiments. The residue analyses with the antifouling agent 1 reduces the non-volatiles to 4-12%. No residue remained when 100% active antifouling agent 2 was used. Therefore, antifouling agent 2 is effective since the film formation is mitigated in sample 2 pyrolysate with no solid precipitation.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5%, 4%, 3%, 2%, or 1% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of reducing or preventing fouling in a plastic-derived synthetic feedstock composition, the method comprising:
   adding an antifouling agent comprising a carboxylic acid anhydride or a copolymer of a dicarboxylic acid anhydride and alpha olefin to a synthetic feedstock composition derived from plastic pyrolysis containing foulant to provide treated pyrolysate.

2. The method of claim 1, wherein the synthetic feedstock comprises a pyrolysis oil.

3. The method of claim 1, wherein the synthetic feedstock comprises about 60-80 wt. % C5-C15, about 20-35 wt. % C16-C29, and about 5 wt. % or less ≥C30.

4. The method of claim 1, wherein the carboxylic acid anhydride is a succinic anhydride, maleic anhydride, acetic anhydride, phthalic anhydride, benzoic anhydride, acrylic and methacrylic anhydride, a derivative thereof, and any combination thereof.

5. The method of claim 1, wherein the antifouling agent is tetrapropylene-succinic anhydride or dodecenyl succinic anhydride.

6. The method of claim 1, wherein the copolymer comprises maleic anhydride and an alpha olefin.

7. The method of claim 1, wherein the antifouling agent is added at an inlet of a quenching tower, at an outlet of a quenching tower, to a storage container including a pyrolysate product, after production of a pyrolysis oil, and any combination thereof.

8. The method of claim 1, wherein the antifouling agent is added from about 10 ppm to 5,000 ppm.

9. The method of claim 1, wherein the foulant comprises nylon, polyvinyl chlorides (PVC), polyethylene terephthalate (PET), polyamides, caprolactam, benzoic acid, phenol, p-cresol, dimethylphenol, isopropyl phenol, tert-butylphenol, dimethylethylphenol, napthalenol, varying lengths of alkenes and alkanes, propylene, tolune, pentene, butane, tetramethylindole, ethylbenzene, ethyldimethylpyrrole, dimethylfuran, tetrahydroquinoline and combinations thereof.

10. The method of claim 1, wherein the synthetic feedstock composition further comprises an antioxidant, a pour point depressant, an extraction solvent, or any combination thereof.

11. The method of claim 1, wherein the synthetic feedstock derived from plastic pyrolysis is obtained by the steps comprising:
   (a) heating plastic under substantially oxygen free conditions at a temperature from about 400° C. to about 850° C. to produce a pyrolysis effluent; and
   (b) cooling and condensing the pyrolysis effluent to obtain a synthetic feedstock; and
   (c) recovering the synthetic feedstock.

12. The method of claim 11, further comprising cooling the recovered synthetic feedstock in a quenching tower, an air-cooled condenser, or a water-cooled condenser.

13. The method of claim 11, wherein the synthetic feedstock comprises polyethylene, polypropylene, polystyrene, and any combination thereof.

14. A composition comprising a synthetic feedstock derived from plastic wherein the synthetic feedstock is obtained by the method of:
   (a) heating plastic under substantially oxygen free conditions at a temperature from about 400° C. to about 850° C. to produce a pyrolysis effluent; and
   (b) cooling and condensing the pyrolysis effluent to obtain a synthetic feedstock;
   (c) recovering the synthetic feedstock;
   (d) adding an antifouling agent to the synthetic feedstock composition to provide a treated synthetic feedstock; and
   (e) separating the treated synthetic feedstock to obtain a synthetic feedstock with reduced foulant.

15. The composition of claim 14, wherein the synthetic feedstock comprises about 60-80 wt. % C5-C15, about 20-35 wt. % C16-C29, and about 5 wt. % or less ≥C30.

16. The composition of claim 14, wherein the antifouling agent comprises a carboxylic acid anhydride or a copolymer of a dicarboxylic acid anhydride and an alpha olefin.

17. The composition of claim 14, wherein the antifouling agent is tetrapropylene-succinic anhydride or wherein the antifouling agent comprises a copolymer of a maleic anhydride and an alpha olefin.

18. The composition of claim 14, wherein the synthetic feedstock composition further comprises an antioxidant, a pour point depressant, an extraction solvent, or any combination thereof.

19. A treated synthetic pyrolysate comprising a synthetic feedstock, a foulant, and an antifouling agent, wherein the antifouling agent is a carboxylic acid anhydride or a copolymer comprising a dicarboxylic acid anhydride and an alpha olefin.

20. The method of claim 1, wherein the method consists of adding the antifouling agent to the synthetic feedstock composition, wherein the antifouling agent consists of the carboxylic acid anhydride or the copolymer of the dicarboxylic acid anhydride and alpha olefin.

* * * * *